US012763380B2

(12) United States Patent
Lee et al.

(10) Patent No.: US 12,763,380 B2
(45) **Date of Patent: *Oct. 13, 2026**

(54) BATTERY PACK AND CONTROL METHOD FOR BATTERY PACK

(71) Applicant: Samsung SDI Co., Ltd., Yongin-si (KR)

(72) Inventors: Jihyeon Lee, Yongin-si (KR); Jaelim Ryu, Yongin-si (KR); Soodeok Moon, Yongin-si (KR); Hwaduk Park, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1056 days.

This patent is subject to a terminal disclaimer.

(21) Appl. No.: 17/817,800

(22) Filed: Aug. 5, 2022

(65) Prior Publication Data

US 2023/0039506 A1 Feb. 9, 2023

(30) Foreign Application Priority Data

Aug. 5, 2021 (KR) ........................ 10-2021-0103440

(51) Int. Cl.
*H01M 10/42* (2006.01)
*H01M 10/48* (2006.01)

(52) U.S. Cl.
CPC ....... *H01M 10/425* (2013.01); *H01M 10/486* (2013.01); *H01M 2010/4271* (2013.01)

(58) Field of Classification Search
CPC ............. H01M 10/425; H01M 10/486; H01M 2010/4271
See application file for complete search history.

(56) References Cited

U.S. PATENT DOCUMENTS 9,198,292 B2 * 11/2015 Kim ...................... H01M 50/51
2011/0210703 A1 * 9/2011 Souza ................. H01M 10/486 320/136

(Continued)

FOREIGN PATENT DOCUMENTS

CN 205178581 U * 4/2016
CN 112600284 A 4/2021

(Continued)

OTHER PUBLICATIONS

DE 102010010144 MT (Year: 2013).*

(Continued)

*Primary Examiner* — Alexander Usyatinsky
(74) *Attorney, Agent, or Firm* — Womble Bond Dickinson (US) LLP

(57) ABSTRACT

A battery pack includes: battery cells; and a measurement circuit unit to measure temperature information of the battery cells, the measurement circuit unit including: a first measurement circuit unit including a first type temperature measurement element; and a second measurement circuit unit including a second type temperature measurement element having a different characteristic of a resistance change according to a temperature change from that of the first type temperature measurement element. The first measurement circuit unit and the second measurement circuit unit are on a common base substrate, or on different individual base substrates from each other.

21 Claims, 16 Drawing Sheets

(56) References Cited

U.S. PATENT DOCUMENTS

| | | | | |
|---|---|---|---|---|
| 2013/0302651 | A1* | 11/2013 | Kim | H01M 50/569 429/7 |
| 2013/0308679 | A1* | 11/2013 | Choi | H01M 10/425 374/152 |
| 2021/0028502 | A1* | 1/2021 | Seol | H01M 10/613 |
| 2022/0190400 | A1 | 6/2022 | Lee | |

FOREIGN PATENT DOCUMENTS

| | | | |
|---|---|---|---|
| DE | 10 2010 010 144 | B4 | 9/2011 |
| DE | 102010010144 | * | 8/2013 |
| FR | 3016217 | A1 | 7/2015 |
| JP | 2966158 | B2 | 8/1999 |
| KR | 10-0782101 | B1 | 12/2007 |
| KR | 10-2013-0125334 | A | 11/2013 |
| KR | 10-2016-0061721 | A | 6/2016 |
| KR | 10-2020-0122124 | A | 10/2020 |
| KR | 10-2021-0007016 | A | 1/2021 |
| KR | 10-2021-0012560 | A | 2/2021 |

OTHER PUBLICATIONS

CN 205178581 MT (Year: 2015).*
The decision of KPO to grant a Patent for Application KR 20210103440 (Year: 2024).*
Chinese Office Action dated Feb. 5, 2026, issued in corresponding Chinese Patent Application No. 202210937258.9 (10 pages).
Extended European Search Report dated May 29, 2024, issued in European Patent Application No. 22188992.6 (9 pages).

* cited by examiner

BATTERY PACK AND CONTROL METHOD FOR BATTERY PACK

CROSS-REFERENCE TO RELATED APPLICATION

This application claims priority to and the benefit of Korean Patent Application No. 10-2021-0103440, filed on Aug. 5, 2021, in the Korean Intellectual Property Office, the entire disclosure of which is incorporated by reference herein.

BACKGROUND

1. Field

Aspects of one or more embodiments relate to a battery pack, and a control method for the battery pack.

2. Description of the Related Art

Generally, unlike primary batteries that cannot be charged, secondary batteries are capable of being charged and discharged. The secondary batteries are used as energy sources of mobile devices, electric vehicles, hybrid vehicles, electric bicycles, uninterruptible power supplies, and the like. Depending on a type of an external device to be applied, the secondary battery may be used in a form of a single battery, or a plurality of secondary batteries may be connected to each other and bundled in one unit to be used in a form of a pack.

A small mobile device, such as a mobile phone, is operable for a certain period of time with an output and capacity of a single battery. However, when long-term operation or high-power operation are desired, like for a larger mobile device, such as a laptop computer, an electric vehicle, or a hybrid vehicle that consume a lot of power, a pack including a plurality of batteries may be used due to output and capacity issues. Also, an output voltage or output current may be increased according to the number of embedded batteries.

The above information disclosed in this Background section is for enhancement of understanding of the background of the present disclosure, and therefore, it may contain information that does not constitute prior art.

SUMMARY

One or more embodiments are directed to a battery pack including a mix of a first type temperature measurement element and a second type temperature measurement element having different resistance characteristics from each other according to a temperature change to prevent or substantially prevent erroneous detection of overheating, while detecting overheating without omission, and a control method for the battery pack.

Additional aspects and features will be set forth, in part, in the description that follows, and in part, will be apparent from the description, or may be learned by practicing one or more of the presented embodiments of the present disclosure.

According to one or more embodiments of the present disclosure, a battery pack includes: battery cells; and a measurement circuit unit configured to measure temperature information of the battery cells, the measurement circuit unit including: a first measurement circuit unit including a first type temperature measurement element; and a second measurement circuit unit including a second type temperature measurement element having a different characteristic of a resistance change according to a temperature change from that of the first type temperature measurement element. The first measurement circuit unit and the second measurement circuit unit are on a common base substrate, or on different individual base substrates from each other.

In an embodiment, the first type temperature measurement element may have a positive characteristic of the resistance change according to the temperature change, and the second type temperature measurement element may have a negative characteristic of the resistance change according to the temperature change.

In an embodiment, the battery cells may be arranged along a first direction; the first measurement circuit unit may include a pair of first measurement circuit units located at opposite sides of the measurement circuit unit in a second direction crossing the first direction; and the second measurement circuit unit may include a pair of second measurement circuit units located at opposite sides of the measurement circuit unit in the second direction.

In an embodiment, the battery pack may further include a battery management system configured to determine an overheated state of the battery cells based on outputs of the pair of first measurement circuit units and the pair of second measurement circuit units.

In an embodiment, the pair of first measurement circuit units may be connected in parallel to each other with respect to the battery management system, and the pair of second measurement circuit units may be connected in parallel to each other with respect to the battery management system.

In an embodiment, the pair of first measurement circuit units may be located at edge locations of the opposite sides of the measurement circuit unit in the second direction; a ground wire may be located at a center location of the measurement circuit unit between the pair of first measurement circuit units; and the pair of second measurement circuit units may be located between the ground wire and different ones of the pair of first measurement circuit units, respectively.

In an embodiment, the pair of first measurement circuit units may have a symmetrical structure based on a center location of the battery cells in the second direction.

In an embodiment, each of the pair of first measurement circuit units may include the first type temperature measurement element located between opposites ends thereof to be balanced back and forth in the first direction, and one first measurement circuit unit from among the pair of first measurement circuit units may provide redundancy for another first measurement circuit unit from among the pair of first measurement circuit units.

In an embodiment, one first measurement circuit unit from among the pair of first measurement circuit units may include the first type temperature measurement element located to be biased towards a forward location in the first direction between opposites ends of the one first measurement circuit unit, and another first measurement circuit unit from among the pair of first measurement circuit units may include the first type temperature measurement element located to be biased toward a backward location in the first direction between opposite ends of the another first measurement circuit unit.

In an embodiment, the first type temperature measurement element may include a plurality of first type temperature measurement elements connected to each other in series between opposite ends of the first measurement circuit unit, and the second type temperature measurement element may include a single second type temperature measurement element connected between opposite ends of the second measurement circuit unit.

In an embodiment, the battery cells may be arranged along a first direction, and the first type temperature measurement element may be located in one column in the first direction at an edge location of the measurement circuit unit in a second direction crossing the first direction.

In an embodiment, the first type temperature measurement element may include a plurality of first type temperature measurement elements located along a first direction along which the battery cells are located and corresponding to the battery cells, respectively, and the second type temperature measurement element may include a plurality of second type temperature measurement elements in a number that is less than or the same as that of the plurality of first type temperature measurement elements.

In an embodiment, the first type temperature measurement element or the second type temperature measurement element may be patterned or mounted in a form of a chip on the common base substrate or the individual base substrates.

In an embodiment, the first type temperature measurement element or the second type temperature measurement element may be patterned with a print screen, or may be patterned with a conductive line including a bent portion.

In an embodiment, each of the battery cells may include: an electrode surface including an electrode; a bottom surface opposite to the electrode surface; a wide side surface occupying a relatively large area; and a narrow side surface occupying a relatively small area, and the wide side surface and the narrow side surface may connect the electrode surface and the bottom surface to each other.

In an embodiment, at least one of the first measurement circuit unit or the second measurement circuit unit may be located on at least the electrode surface of the battery cells.

In an embodiment, at least one of the first measurement circuit unit or the second measurement circuit unit may be located on at least the wide side surface of the battery cells.

In an embodiment, at least one of the first measurement circuit unit or the second measurement circuit unit may be located on at least the narrow side surface of the battery cells.

In an embodiment, at least one of the first measurement circuit unit or the second measurement circuit unit may be located on at least the bottom surface of the battery cells.

In an embodiment, the battery cells may include: an angular battery cell including a case having a hexahedral shape; a circular battery cell including a case having a cylindrical shape; or a pouch battery cell including a case having a pouch shape, and the case may define an exterior of the battery cells.

In an embodiment, the common base substrate or the individual base substrates may include a flexible insulating film or a rigid insulating substrate.

According to one or more embodiments of the present disclosure, a control method for a battery pack is provided. The battery pack includes: battery cells; and a measurement circuit unit configured to measure temperature information of the battery cells, the measurement circuit unit including: a first measurement circuit unit including a first type temperature measurement element; and a second measurement circuit unit including a second type temperature measurement element having a different characteristic of a resistance change according to a temperature change from that of the first type temperature measurement element. The control method includes determining an overheated state of the battery cells based on a difference value between a first measurement value and a second measurement value, the first measurement value being based on an output of the first measurement circuit unit, and the second measurement value being based on an output of the second measurement circuit unit.

In an embodiment, the first type temperature measurement element may have a positive characteristic of the resistance change according to the temperature change, and the second type temperature measurement element may have a negative characteristic of the resistance change according to the temperature change.

In an embodiment, the first type temperature measurement element may exhibit a nonlinear rapid change above an inflection point of a profile of the resistance change according to the temperature change, and the second type temperature measurement element may exhibit a linear gradual change in the profile of the resistance change according to the temperature change.

In an embodiment, the control method may further include: comparing the first measurement value with a trigger point corresponding to an inflection point of the first type temperature measurement element; and when the first measurement value is equal to or greater than the trigger point while the difference value between the first measurement value and the second measurement value is equal to or greater than a threshold value, determining that at least one of the battery cells are overheated.

In an embodiment, the first measurement value and the second measurement value may change according to the temperature change, while following resistance changes of the first type temperature measurement element and the second type temperature measurement element, respectively, and a size of the difference value between the first measurement value and the second measurement value may increase according to an increase in temperature.

In an embodiment, the determining of the overheated state of the battery cells may include: comparing the difference value between the first measurement value and the second measurement value with a threshold value; and determining that the battery cells are overheated when the difference value is equal to or greater than a threshold value.

In an embodiment, the threshold value may correspond to a difference between first temperature data and second temperature data, the first temperature data being based on resistance of the first type temperature measurement element, and the second temperature data being based on resistance of the second type temperature measurement element.

In an embodiment, the control method may further include calculating the difference value between the first measurement value and the second measurement value according to a first conversion measurement value and a second conversion measurement value, and the first conversion measurement value and the second conversion measurement value may be obtained by converting a number of first type temperature measurement elements included in the first measurement circuit unit and a number of second type temperature measurement elements included in the second measurement circuit unit to be equal to each other.

In an embodiment, the first measurement circuit unit may include a plurality of first type temperature measurement elements arranged along a first direction in which the battery cells are arranged, each of the plurality of first type temperature measurement element being allocated for a corresponding one of the battery cells, and the second measurement circuit unit may include different second measurement circuit units, each including a single second type temperature measurement element.

In an embodiment, the plurality of first type temperature measurement elements may be connected to each other in series between opposite ends of the first measurement circuit unit, and the single second type temperature measurement elements may be connected between opposite ends of the different second measurement circuit units, respectively.

In an embodiment, the first conversion measurement value and the second conversion measurement value may be obtained by converting the first measurement value based on the output of the first measurement circuit unit into the first conversion measurement value, and converting, into the second conversion measurement value, a value obtained by multiplying a number of battery cells by a representative value from among different second measurement values based on outputs of the different second measurement circuit units.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
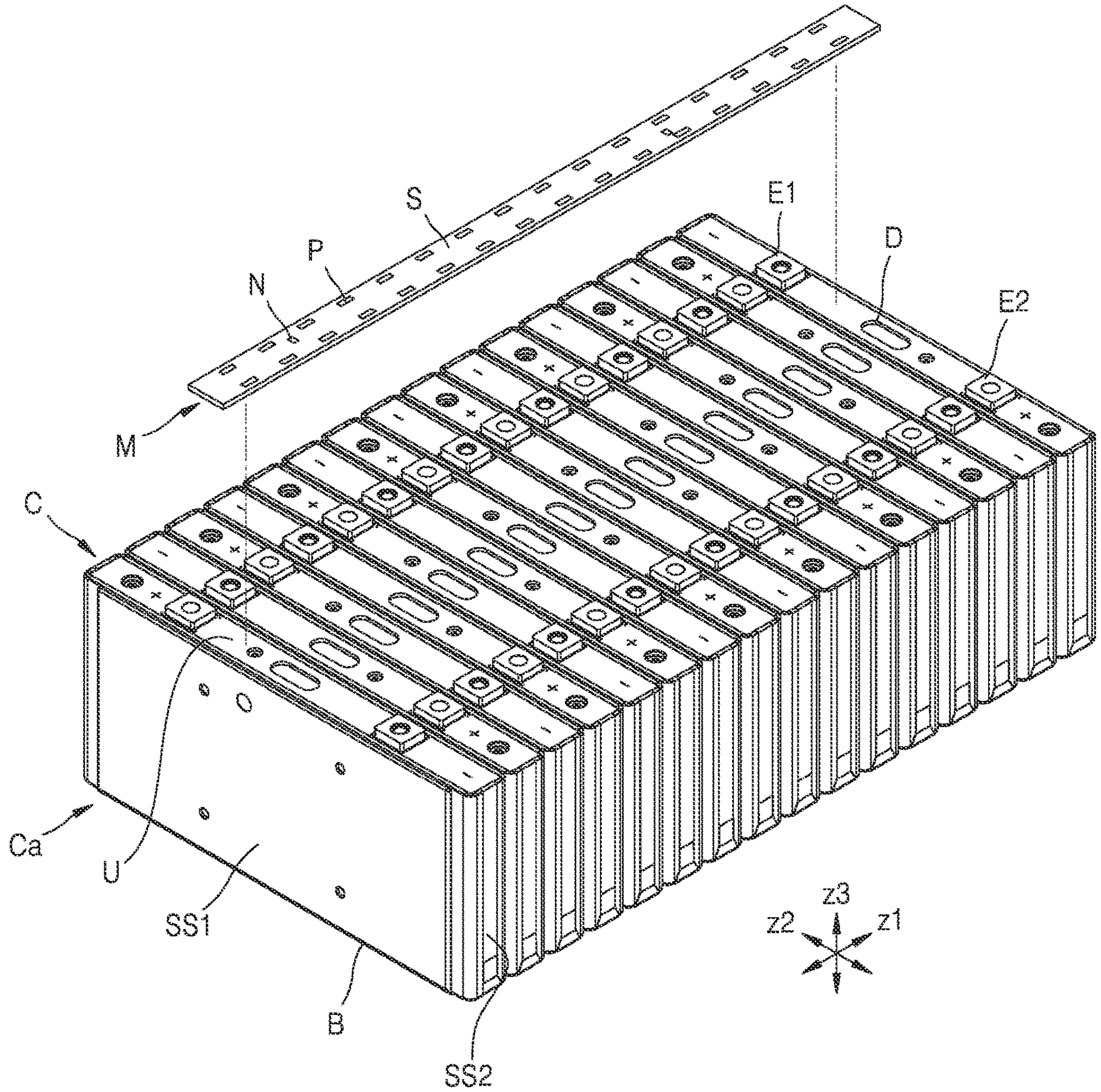
FIG. 1 is an exploded perspective view of a battery pack, according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components (e.g., the various units described herein) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
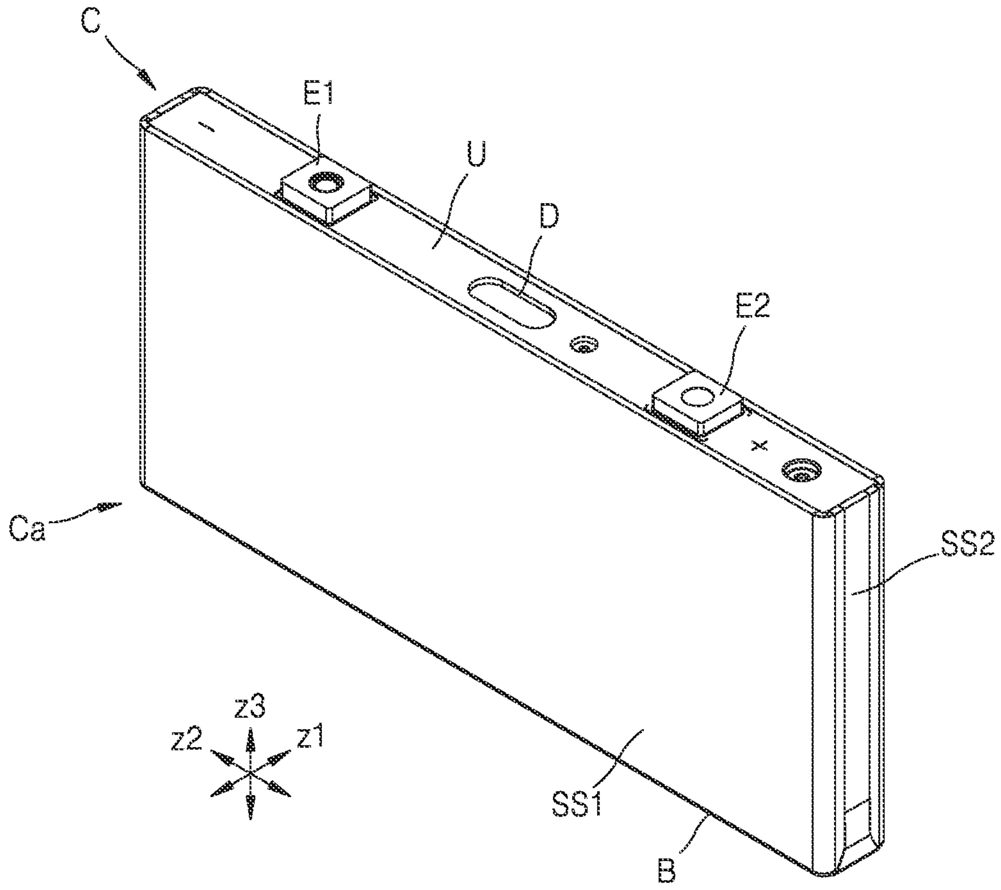
FIG. 2 is a perspective view of a battery cell of FIG. 1.
Figure 3:
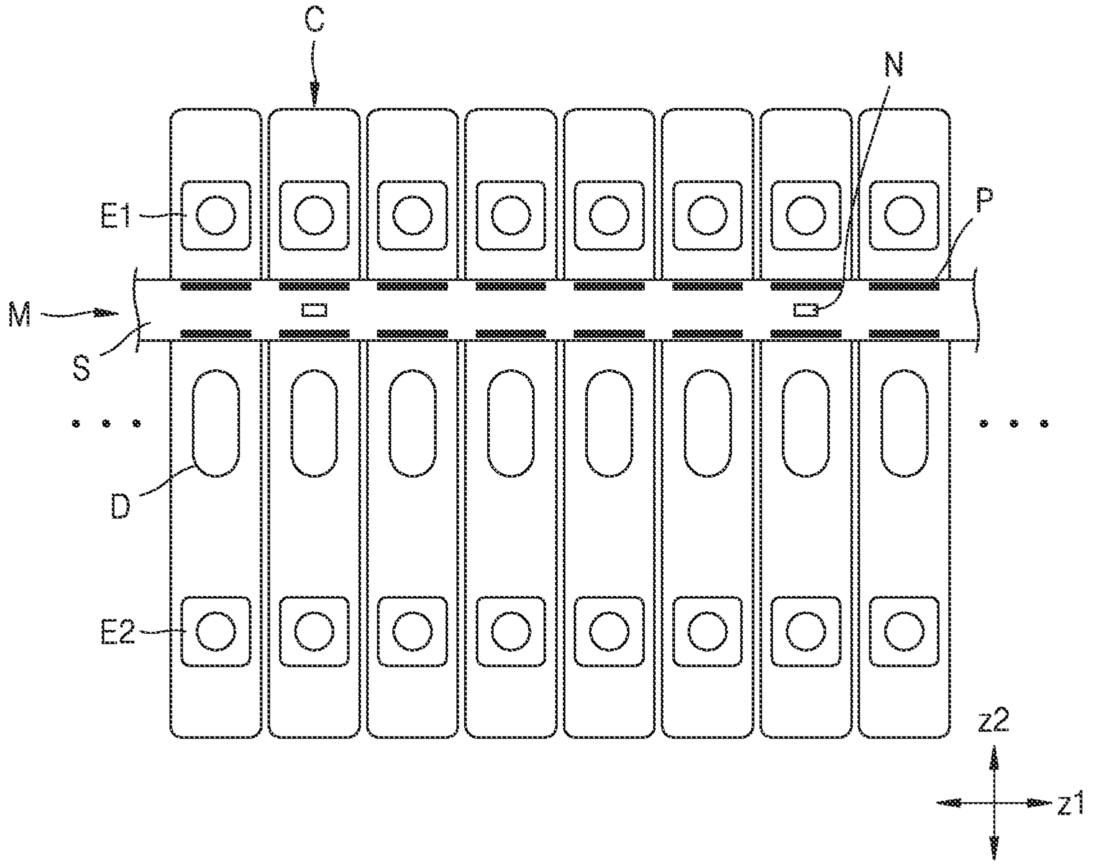
FIG. 3 illustrates an arrangement of a measurement circuit unit of FIG. 1.
Figure 4:
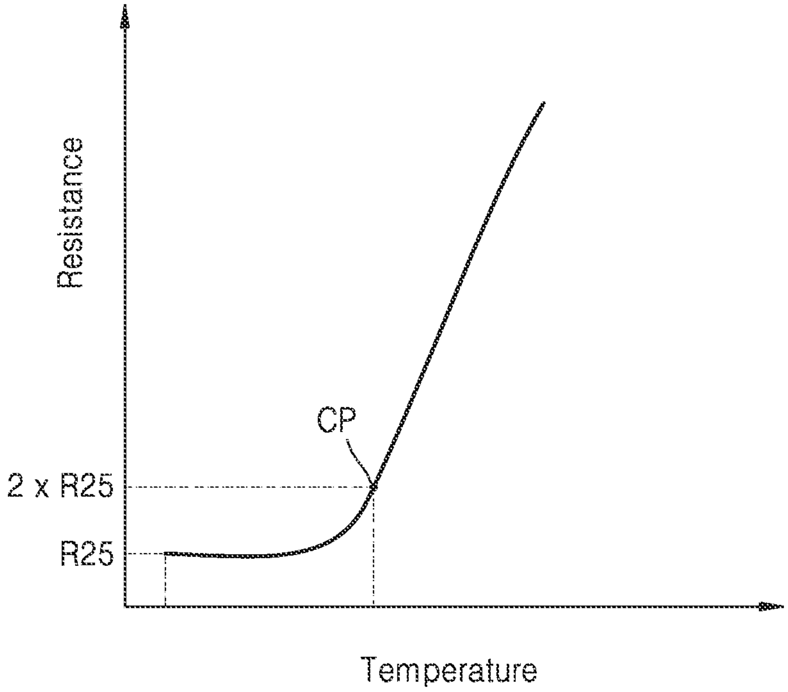
FIG. 4 is a graph illustrating a behavior of a positive temperature coefficient (PTC), in which a resistance change according to a temperature change has a positive characteristic, according to embodiments of a first type temperature measurement element and a second type temperature measurement element.
Figure 5:
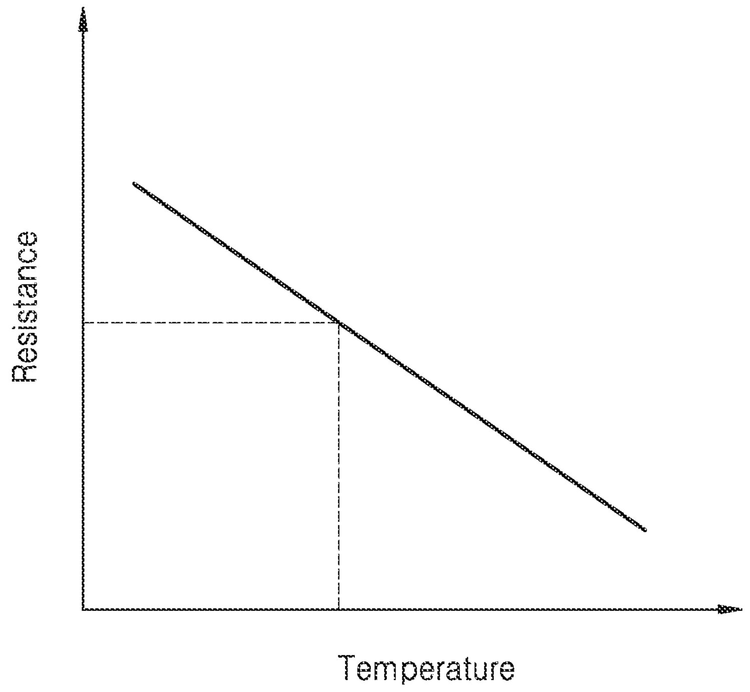
FIG. 5 is a graph illustrating a behavior of a negative temperature coefficient (NTC), in which a resistance change according to a temperature change has a negative characteristic, according to embodiments of a first type temperature measurement element and a second type temperature measurement element.
Figure 6:
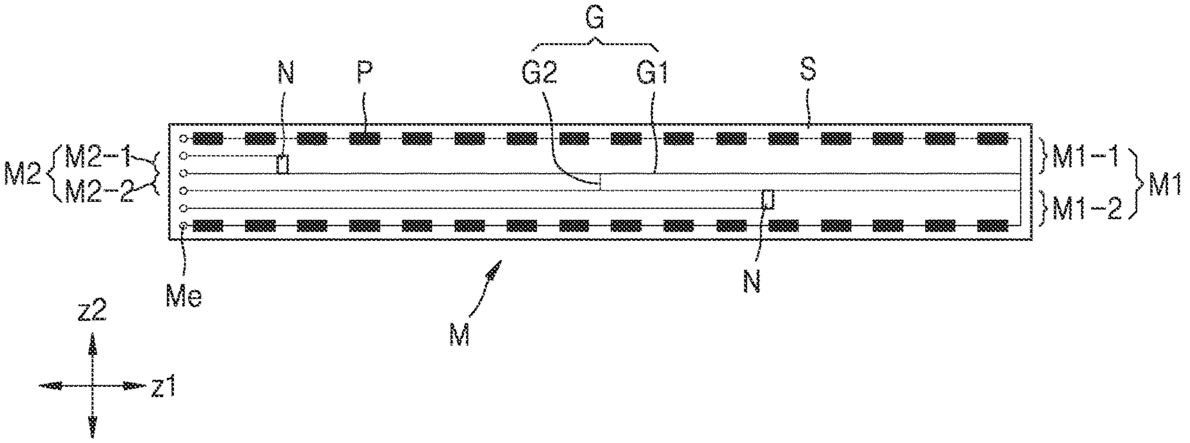
FIG. 6 illustrates a configuration of a measurement circuit unit, according to an embodiment.
Figure 7:
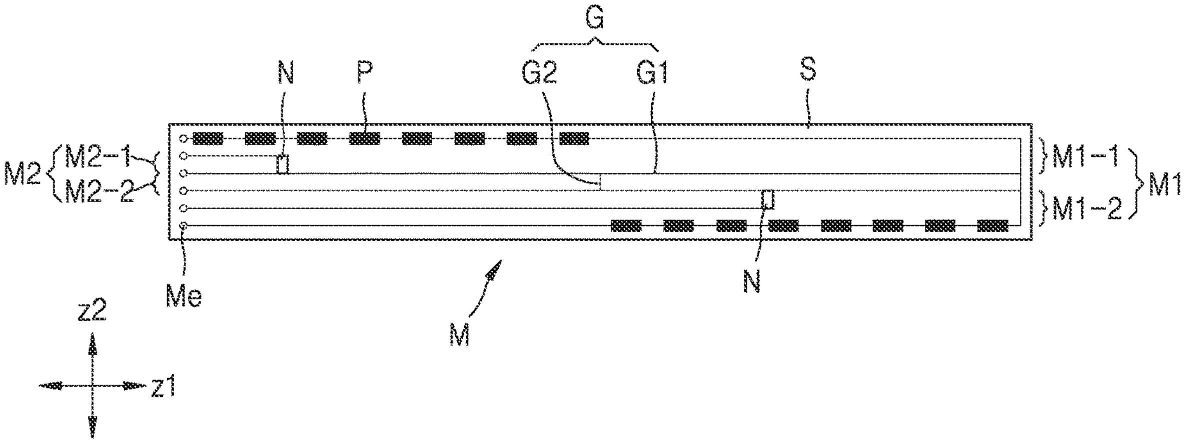
FIG. 7 illustrates a configuration of a measurement circuit unit, according to another embodiment.

FIG. 1 is an exploded perspective view of a battery pack, according to an embodiment. FIG. 2 is a perspective view of a battery cell C of FIG. 1. FIG. 3 illustrates an arrangement of a measurement circuit unit (e.g., a measurement circuit or a measurement device) M of FIG. 1. FIG. 4 is a graph illustrating a behavior of a positive temperature coefficient (PTC), in which a resistance change according to a temperature change has a positive characteristic, according to embodiments of a first type temperature measurement element P and a second type temperature measurement element N. FIG. 5 is a graph illustrating a behavior of a negative temperature coefficient (NTC), in which a resistance change according to a temperature change has a negative characteristic, according to embodiments of the first type temperature measurement element P and the second type temperature measurement element N. FIG. 6 illustrates a configuration of the measurement circuit unit M, according to an embodiment. FIG. 7 illustrates a configuration of the measurement circuit unit M, according to another embodiment. FIGS. 8A through 8D illustrate a configuration of the measurement circuit unit M, according to various different embodiments.

Referring to FIGS. 1 through 8D, the battery pack according to an embodiment may include the battery cell C, and the measurement circuit unit M configured to measure temperature information of the battery cell C. The measurement circuit unit M may include a first measurement circuit unit (e.g., a first measurement circuit) M1 and second measurement circuit unit (e.g., a second measurement circuit) M2, which include the first type temperature measurement element P and the second type temperature measurement element N, respectively. The first type temperature measurement element P and the second type temperature measurement element N may have different characteristics from each other of a resistance change according to a temperature change. The first measurement circuit unit M1 and second measurement circuit unit M2 may be formed on a common base substrate S.

The battery pack according to an embodiment may include a plurality of the battery cells C arranged along a first direction Z1. The battery cell C may be provided in any one of various suitable shapes, such as an angular shape, a circular shape, or the like. According to an embodiment, the battery cell C may be provided as an angular battery cell including a case Ca having approximately a hexahedral shape. According to other embodiments, the battery cell C may be provided as a circular battery cell including a case having approximately a cylindrical shape.

The battery cell C may include an electrode assembly, the case Ca accommodating the electrode assembly, and a first electrode E1 and a second electrode E2 provided on the case Ca and electrically connected to the electrode assembly. For example, the first electrode E1 and second electrode E2 may be different electrodes that are spaced apart from each other in a second direction Z2 crossing the first direction Z1.

According to an embodiment, depending on a type of the case Ca, the battery cell C may be provided as an angular battery cell that includes a relatively rigid frame and has a hexahedral shape, or a pouch battery cell that includes the case Ca having a relatively flexible pouch shape. The aspects and features described in more detail below may be applied to both the angular battery cell and the pouch battery cell in the same or substantially the same manner, and thus, for convenience, the battery cell C may be described in more detail hereinafter in the context of the angular battery cell.

According to an embodiment, the battery cell C, or the case Ca forming an exterior of the battery cell C, may include an electrode surface U where the first electrode E1 and second electrode E2 are formed, a bottom surface B opposite to the electrode surface U, a wide side surface SS1 occupying a relatively large area and where the plurality of battery cells C arranged along the first direction Z1 face one another, and a narrow side surface SS2 occupying a relatively small area. The wide side surface SS1 and the narrow side surface SS2 connect the electrode surface U and the bottom surface B to each other. For example, the electrode surface U and bottom surface B may face away from each other in a third direction Z3 crossing the first direction Z1 and second direction Z2.

The battery pack according to an embodiment may include the measurement circuit unit M configured to measure the temperature information of the battery cell C. The measurement circuit unit M may extend in the first direction Z1 along which the battery cells C are arranged, and may extend along the electrode surface U or the narrow side surface SS2 of the battery cell C. In some embodiments, the measurement circuit unit M may extend generally in the first direction Z1, while a branch is provided between the wide side surfaces SS1 of neighboring battery cells C.

According to an embodiment, the measurement circuit unit M may extend in the first direction Z1 along which the battery cells C are arranged, and may be arranged between the first electrode E1 and the second electrode E2 arranged at edge locations of opposite sides in the second direction Z2. For example, the measurement circuit unit M may be arranged, in the second direction Z2, between one of the first electrode E1 or the second electrode E2 and a vent hole D formed at a center location between the first electrode E1 and the second electrode E2. The measurement circuit unit M is arranged between one of the first electrode E1 or the second electrode E2 and the vent hole D, and thus, may not interfere with a release of a high-temperature high-pressure gas discharged through the vent hole D, and may avoid damage that may be caused by the release of the high-temperature high-pressure gas.

The battery pack according to an embodiment includes the measurement circuit unit M for measuring the temperature information of the battery cell C, and may include the first measurement circuit unit M1 and the second measurement circuit unit M2 including the first type temperature measurement element P and the second type temperature measurement element N, respectively, that have different characteristics from each other of the resistance change according to the temperature change.

For example, the first type temperature measurement element P may include a PTC device that displays (e.g., exhibits) a positive characteristic for a change in electric resistance according to the temperature change, and the second type temperature measurement element N may include an NTC device that displays (e.g., exhibits) a negative characteristic for a change in electric resistance according to the temperature change. In more detail, FIGS. 4 and 5 illustrate a profile showing the positive characteristic of the first type temperature measurement element P, and a profile showing the negative characteristic of the second type temperature measurement element N, respectively. For example, the first type temperature measurement element P may have a nonlinear behavior, in which there is almost no change in a relatively low temperature section according to a temperature change from a room temperature (e.g., room temperature resistance: R25), but a rapid change is displayed from a relatively high temperature section around an inflection point CP (e.g., twice the room temperature resistance: 2×R25). In more detail, resistance may barely change according to the temperature change in the relatively low temperature section, but may rapidly change from a high temperature section equal to or greater than a temperature (e.g., the inflection point CP) corresponding to a resistance twice the room temperature resistance (2×R25). For example, an abnormal temperature may be sensed by detecting a threshold point (e.g., the inflection point CP) where a rapid resistance change of the first type temperature measurement element P is started according to an increase in a temperature, and the abnormal temperature or a sign of the abnormal temperature may be sensed by detecting the threshold point (e.g., a predetermined threshold point).

According to an embodiment, together with the first type temperature measurement element P, the second type temperature measurement element N having a different resistance characteristic from that of the first type temperature measurement element P is introduced, and overheating is determined considering outputs of the first type temperature measurement element P and second type temperature measurement element N together. Accordingly, compared with a comparative example of determining overheating only with the output of the first type temperature measurement element P, an abnormal temperature or overheating of the battery cell C may be precisely detected without omission. As described above, due to a rapid resistance change in a high temperature section and a nonlinear behavior, it may not be easily for the first type temperature measurement element P to accurately measure a temperature of the battery cell C.

Unlike the nonlinear behavior of the first type temperature measurement element P, the second type temperature measurement element N may display an approximately linear change from a room temperature. The second type temperature measurement element N may display an approximately linear change throughout a low temperature section and the high temperature section, instead of the nonlinear behavior that is different in the low temperature section and the high temperature section like the first type temperature measurement element P. Accordingly, the temperature of the battery cell C may be further accurately measured through the second type temperature measurement element N, rather than through the first type temperature measurement element P alone. According to an embodiment of the present disclosure, erroneous detection of overheating may be prevented or substantially prevented, and overheating may be detected without omission, by introducing together the first type temperature measurement element P and second type temperature measurement element N having different characteristics from each other of a resistance change according to a temperature change.

The battery pack according to an embodiment may include the plurality of battery cells C arranged in one column along the first direction Z1, and may include the measurement circuit unit M for measuring state information from the plurality of battery cells C arranged in the one column. Here, the measurement circuit unit M may include the first measurement circuit unit M1 including at least two first type temperature measurement elements P arranged at different measurement locations, and the second measurement circuit unit M2 including at least two second type temperature measurement elements N arranged at different measurement locations. The first measurement circuit unit M1 may include at least two first measurement circuit units (e.g., at least two first measurement circuits) M1, each including a plurality of the first type temperature measurement elements P.

According to an embodiment, the first measurement circuit unit M1 may include the plurality of first type temperature measurement elements P arranged to be allocated for the battery cells C, respectively, in the first direction Z1 along which the battery cells C are arranged. Here, each first type temperature measurement element P may display a change in resistance, while reacting to a temperature of each corresponding allocated battery cell C. According to an embodiment, the plurality of first type temperature measurement elements P may be arranged in one column along the first direction Z1 at edge locations of the first measurement circuit unit M1 extending in the first direction Z1, and may be arranged at measurement locations corresponding to the battery cells C, respectively.

According to an embodiment, the first measurement circuit unit M1 may include two or more first measurement circuit units M1, and for example, may include a (1-1)th measurement circuit unit M1-1 and a (1-2)th measurement circuit unit M1-2. According to an embodiment, a pair of the first measurement circuit units M1 may be arranged at different measurement locations on left and right in the second direction Z2 to detect the temperature of the battery cell C at different measurement locations. Also, the first measurement circuit units M1 having the same or substantially the same configuration as each other may be arranged at symmetric or substantially symmetric locations in the second direction Z2, and thus, even when one first measurement circuit unit M1 is disconnected, redundancy may be provided through the other first measurement circuit unit M1, such that temperature detection is not stopped. However, according to various embodiments, there may be a single first measurement circuit unit M1, rather than the pair of first measurement circuit units M1 arranged at different measurement locations on left and right in the second direction Z2. For example, the temperature of the battery cell C may be detected through a single first measurement circuit unit M1 arranged at a measurement location on left or right in the second direction Z2 or at a center measurement location in the second direction Z2.

In each first measurement circuit unit M1, the first type temperature measurement elements P may be connected to each other in series between opposite ends of the first measurement circuit unit M1. In other words, the first type temperature measurement elements P may be connected to each other in series between opposite ends of the first measurement circuit unit M1 in the first direction Z1 along which the battery cells C are arranged, and an abnormal temperature or overheating of the battery cell C may be detected through a combined resistance obtained by adding resistances of the first type temperature measurement elements P that are connected to each other in series with each other. As described above, the pair of first measurement circuit units M1 arranged to provide redundancy at different measurement locations in the second direction Z2 may have the same or substantially the same structure as each other, may each detect the combined resistance obtained by adding the resistances of the plurality of first type temperature measurement elements P connected to each other in series between opposite ends of the first measurement circuit unit M1 with each other, and may detect individual combined resistance for each first measurement circuit unit M1.

According to an embodiment, the abnormal temperature or overheating of the battery cell C may be detected considering all combined resistances of the different first measurement circuit units M1, for example, such as a maximum value or average value of different combined resistances of the different first measurement circuit units M1, or selectively considering one of the combined resistances of the first measurement circuit units M1. The combined resistances output from the different first measurement circuit units M1 may be used as inputs to determine whether a disconnection condition of the first measurement circuit unit M1 is satisfied. The abnormal temperature or overheating of the battery cell C may be detected by excluding combined resistances of a disconnected first measurement circuit unit M1, and using the combined resistances of a remaining (e.g., connected) first measurement circuit unit M1.

Unlike the first measurement circuit unit M1, the second measurement circuit unit M2 may include at least two second measurement circuit units M2-1 and M2-2, each including a single second type temperature measurement element N. According to an embodiment, the second measurement circuit unit M2 may include two second measurement circuit units M2, for example, such as a (2-1)th measurement circuit unit M2-1 and a (2-2)th measurement circuit unit M2-2. According to an embodiment, the different second measurement circuit units M2 (e.g., the (2-1)th measurement circuit unit M2-1 and the (2-2)th measurement circuit unit M2-2) may include different second type temperature measurement elements N for detecting the temperature of the battery cell C at different measurement locations by being arranged at different measurement locations in the first direction Z1 along which the battery cells C are arranged.

In other words, according to an embodiment, the second type temperature measurement elements N may each form the second measurement circuit unit M2, and the different second type temperature measurement elements N may be connected to both ends of the different second measurement circuit units M2 to be connected to a battery management system BMS described in more detail below through different measurement channels. According to an embodiment, an output of the second type temperature measurement element N may be connected to different electrodes (e.g., pins or ports) of the battery management system BMS through the different second measurement circuit units M2 (for example, through wires of the second measurement circuit units M2) that provide the different measurement channels. According to an embodiment, the second type temperature measurement element N may be provided in a form of a chip, and the output of the second type temperature measurement element N may be input to the battery management system BMS through a dedicated measurement channel or the second measurement circuit unit M2 (for example, through the wire of the second measurement circuit unit M2).

According to an embodiment, a pair of the second measurement circuit units M2 may be arranged at measurement locations between the pair of first measurement circuit units M1 arranged at the edge locations on opposite sides of the measurement circuit unit M in the second direction Z2. The second type temperature measurement elements N included in the pair of second measurement circuit units M2, respectively, may be arranged at different measurement locations in the first direction Z1, and at different measurement locations in the second direction Z2, so as to avoid physical interference between the second measurement circuit units M2 arranged adjacent to each other in the second direction Z2. In other words, the second type temperature measurement elements N included in the pair of second measurement circuit units M2, respectively, may be arranged at measurement locations that are spaced apart from each other in the first direction Z1 and second direction Z2, and for example, may be arranged along diagonal locations following the first direction Z1 and second direction Z2 together.

The different first measurement circuit units M1 (e.g., the (1-1)th measurement circuit unit M1-1 and (1-2)th measurement circuit unit M1-2) and the different second measurement circuit units M2 (e.g., the (2-1)th measurement circuit unit M2-1 and (2-2)th measurement circuit unit M2-2) may share a ground wire G. The ground wire G may be arranged at a center location between the different second measurement circuit units M2 in the second direction Z2, and may include two or more conductive wires G1, and a connecting wire G2 between the different conductive wires G1, considering a wire resistance. The ground wire G may provide one ends of the different first measurement circuit units M1 (e.g., the (1-1)th measurement circuit unit M1-1 and (1-2)th measurement circuit unit M1-2) and the different second measurement circuit units M2 (e.g., the (2-1)th measurement circuit unit M2-1 and (2-2)th measurement circuit unit M2-2).

According to an embodiment, the different first measurement circuit units M1 (e.g., the (1-1)th measurement circuit unit M1-1 and (1-2)th measurement circuit unit M1-2) may be arranged at the edge locations of the measurement circuit unit M in the second direction Z2, the ground wire G may be arranged at the center location between the different first measurement circuit units M1 (e.g., the (1-1)th measurement circuit unit M1-1 and (1-2)th measurement circuit unit M1-2), and the different second measurement circuit units M2 (e.g., the (2-1)th measurement circuit unit M2-1 and (2-2)th measurement circuit unit M2-2) may be arranged between the ground wire G and the first measurement circuit units M1 (e.g., the (1-1)th measurement circuit unit M1-1 and (1-2)th measurement circuit unit M1-2), respectively.

In an embodiment shown in FIG. 6, the different first measurement circuit units M1 (e.g., the (1-1)th measurement circuit unit M1-1 and (1-2)th measurement circuit unit M1-2) may include the plurality of first type temperature measurement elements P arranged symmetrically or substantially symmetrically with each other, and may detect the abnormal temperature or overheating of the battery cell C in balance back and forth in the first direction Z1 through the first type temperature measurement elements P arranged in balance back and forth in the first direction Z1 along which the battery cells C are arranged. For example, in the embodiment of FIG. 6, the (1-1)th measurement circuit unit M1-1 and (1-2)th measurement circuit unit M1-2 may expect an equal or substantially equal output when ignoring a temperature deviation and measurement error in the second direction Z2.

The first type temperature measurement elements P may be arranged along the first direction Z1 at the edge locations in the second direction Z2 in which the different first measurement circuit units M1 face each other, and may sensitively react to temperatures inside the battery cells C through the first electrode E1 and second electrode E2 of the battery cells C at the edge locations in the second direction Z2. Also, the first type temperature measurement elements P may be symmetrically or substantially symmetrically arranged at the edge locations on farthest opposite sides in the second direction Z2, so as to avoid physical interference or thermal interference between the different first type temperature measurement elements P belonging to the different first measurement circuit units M1. Accordingly, the plurality of first type temperature measurement elements P may be connected to each other along wires at the edge locations in the second direction Z2 at each first measurement circuit unit M1, and the first type temperature measurement elements P may not be connected to a wire at an inner location in the second direction Z2.

FIG. 7 schematically illustrates the measurement circuit unit M, according to another embodiment. The measurement circuit unit M of FIG. 7 may include different first measurement circuit units M1 (e.g., a (1-1)th measurement circuit unit M1-1 and a (1-2)th measurement circuit unit M1-2), and each of the first measurement circuit units M1 (e.g., the (1-1)th measurement circuit unit M1-1 and (1-2)th measurement circuit unit M1-2) may include a plurality of the first type temperature measurement elements P connected to each other in series between opposite ends.

In the embodiment shown in FIG. 7, the different first measurement circuit units M1 (e.g., the (1-1)th measurement circuit unit M1-1 and (1-2)th measurement circuit unit M1-2) may include the plurality of first type temperature measurement elements P arranged asymmetrically. The (1-1)th measurement circuit unit M1-1 may include the plurality of first type temperature measurement elements P that are biased forward in the first direction Z1 along which the battery cells C are arranged, and the (1-2)th measurement circuit unit M1-2 may include the plurality of first type temperature measurement elements P that are biased backward in the first direction Z1. As such, the plurality of first type temperature measurement elements P are arranged to have different measurement locations in the first direction Z1 along which the battery cells C are arranged, for example, such that the (1-1)th measurement circuit unit M1-1 includes the plurality of first type temperature measurement elements P arranged at front measurement locations in the first direction Z1, while the (1-2)th measurement circuit unit M1-2 includes the plurality of first type temperature measurement elements P arranged at rear measurement locations in the first direction Z1. Accordingly, the abnormal temperature or overheating of the battery cells C arranged forward in the first direction Z1 may be sensitively detected through an output of the (1-1)th measurement circuit unit M1-1, and the abnormal temperature or overheating of the battery cells C arranged backward in the first direction Z1 may be sensitively detected through an output of the (1-2)th measurement circuit unit M1-2. For example, the abnormal temperature or overheating of the battery cells C arranged in the first direction Z1 may be sensed in balance back and forth, by combining the outputs of the (1-1)th measurement circuit unit M1-1 and (1-2)th measurement circuit unit M1-2.

For example, according to an embodiment, the number of first type temperature measurement elements P included in the (1-1)th measurement circuit unit M1-1 may be designed to be the same or substantially the same as the number of first type temperature measurement elements P included in the (1-2)th measurement circuit unit M1-2. The number of first type temperature measurement elements P included in the entire first measurement circuit units M1 in the first direction Z1 along which the battery cells C are arranged may be halved, and the (1-1)th measurement circuit unit M1-1 may be formed by connecting half of the first type temperature measurement elements P arranged at the front measurement locations in the first direction Z1 and the (1-2)th measurement circuit unit M1-2 may be formed by connecting the remaining half of the first type temperature measurement elements P arranged at the rear measurement locations, thereby equally bisecting a measurement load of the (1-1)th measurement circuit unit M1-1 and a measurement load of the (1-2)th measurement circuit unit M1-2.

According to an embodiment, considering that the number of front measurement locations (e.g., the number of front battery cells C) and the number of rear measurement locations (e.g., the number of rear battery cells C), which are in charge of the (1-1)th measurement circuit unit M1-1 and (1-2)th measurement circuit unit M1-2, are the same, a deviation between the combined resistance of the (1-1)th measurement circuit unit M1-1 and the combined resistance of the (1-2)th measurement circuit unit M1-2) caused by a wire resistance may be easily removed or reduced when the wire resistance of the (1-1)th measurement circuit unit M1-1 and the wire resistance of the (1-2)th measurement circuit unit M1-2 are designed to be balanced. In this regard, according to an embodiment, an entire wire length of the (1-1)th measurement circuit unit M1-1 and an entire wire length of the (1-2)th measurement circuit unit M1-2 may be designed to be the same or substantially the same with each other. For example, when a terminal Me formed at one end portion of the first measurement circuit unit M1 is connected to an electrode of the battery management system BMS at a forward location of the first measurement circuit unit M1 in the first direction Z1, the (1-1)th measurement circuit unit M1-1 in charge of the relatively front measurement location does not extend across the front measurement locations (e.g., the front first type temperature measurement elements P) in the first direction Z1, but may include an extending portion extending in the first direction Z1 at backwards to be balanced with the (1-2)th measurement circuit unit M1-2 in the entire wire length.

According to various embodiments, the number of first type temperature measurement elements P included in the (1-1)th measurement circuit unit M1-1 may be designed to be different from the number of first type temperature measurement elements P included in the (1-2)th measurement circuit unit M1-2. The number of first type temperature measurement elements P included in the entire first measurement circuit units M1 in the first direction Z1 along which the battery cells C are arranged may be divided in a suitable ratio (e.g., a set or predetermined ratio), and the (1-1)th measurement circuit unit M1-1 may be formed by connecting some of the first type temperature measurement elements P arranged at the front measurement locations in the first direction Z1 with each other, and the (1-2)th measurement circuit unit M1-2 may be formed by connecting the remaining of the first type temperature measurement elements P arranged at the rear measurement locations with each other.

For example, according to various embodiments, considering characteristics of the first type temperature measurement elements P, such as dispersion or resolution of the first type temperature measurement elements P, the number of first type temperature measurement elements P may be divided in an odd number, such as trisection, instead of bisection, so as to configure different first measurement circuit units M1.

In the embodiment shown in FIG. 7, the number of first type temperature measurement elements P included in the measurement circuit unit M is reduced overall by using the different first measurement circuit units M1 having an asymmetric arrangement of the first type temperature measurement elements P, thereby reducing manufacturing costs of the measurement circuit unit M. Also, by halving the plurality of first type temperature measurement elements P arranged in the first direction Z1, the different (1-1)th measurement circuit unit M1-1 and (1-2)th measurement circuit unit M1-2) are configured as the (1-1)th measurement circuit unit M1-1 is formed by using the half of the first type temperature measurement elements P and the (1-2)th measurement circuit unit M1-2 is formed by using the remaining half of the first type temperature measurement elements P. Accordingly, even when one first measurement circuit unit M1 is disconnected, an abnormal temperature or overheating may be detected without stopping of temperature measurement, by using the remaining first measurement circuit unit M1.

Figure 8A:
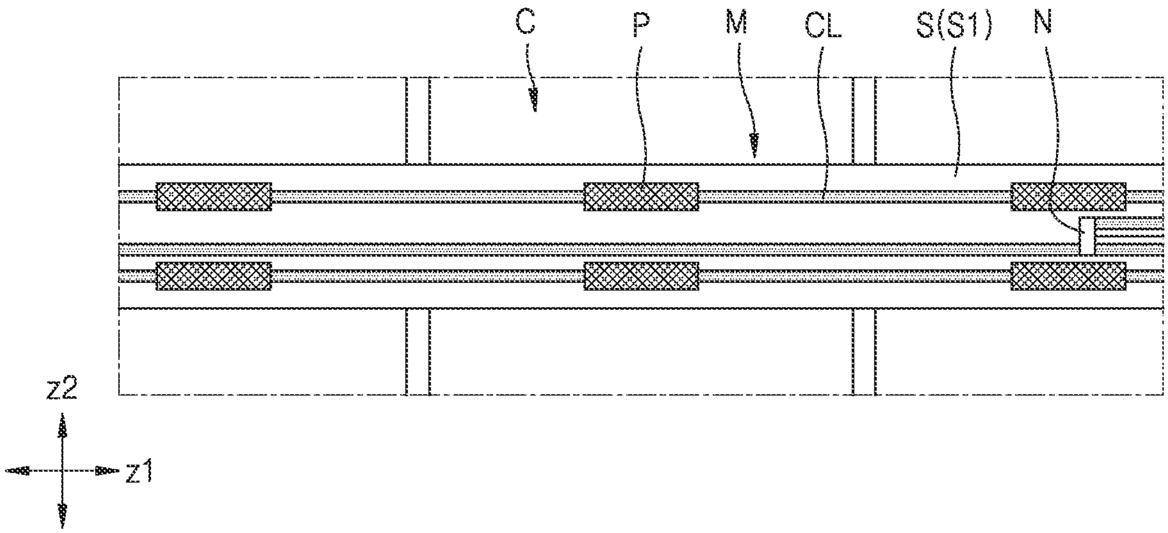
FIGS. 8A-8D illustrate a configuration of a measurement circuit unit, according to various different embodiments.
Figure 8B:
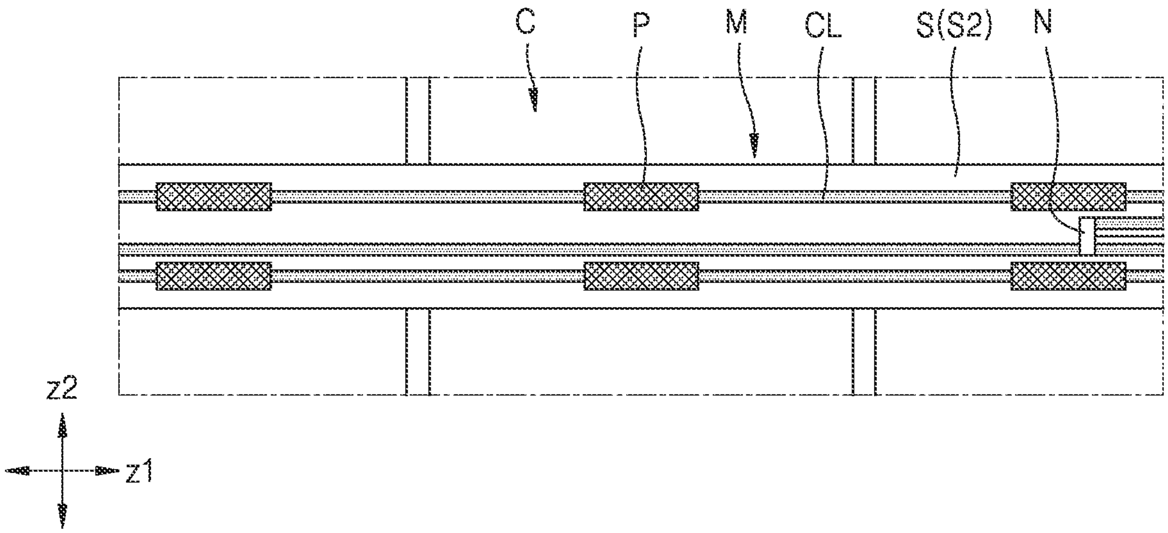

Referring to FIGS. 8A and 8B, the measurement circuit unit M may be packaged, using the common base substrate S as a support base of the measurement circuit unit M, to a flexible circuit board including a flexible insulating film S1, or a rigid circuit board including a rigid insulating substrate S2, and the first measurement circuit unit M1 and second measurement circuit unit M2 may be modularized as one component that is not separated from each other. In more detail, the first measurement circuit unit M1 and second measurement circuit unit M2 may be supported on the common base substrate S, and for example, the first measurement circuit unit M1 and second measurement circuit unit M2 may be supported on the flexible insulating film S1 that is used as the common base substrate S, and thus, may be packaged on one flexible circuit board. As another example, the first measurement circuit unit M1 and second measurement circuit unit M2 may be supported on the rigid insulating substrate S2 that is used as the common base substrate S, and thus, may be packaged on one rigid circuit board. The edge location or the center location of the measurement circuit unit M in the second direction Z2 crossing the first direction Z1 along which the battery cells C are arranged may correspond to an edge location or a center location of the common base substrate S forming a base of the measurement circuit unit M.

Figure 8C:
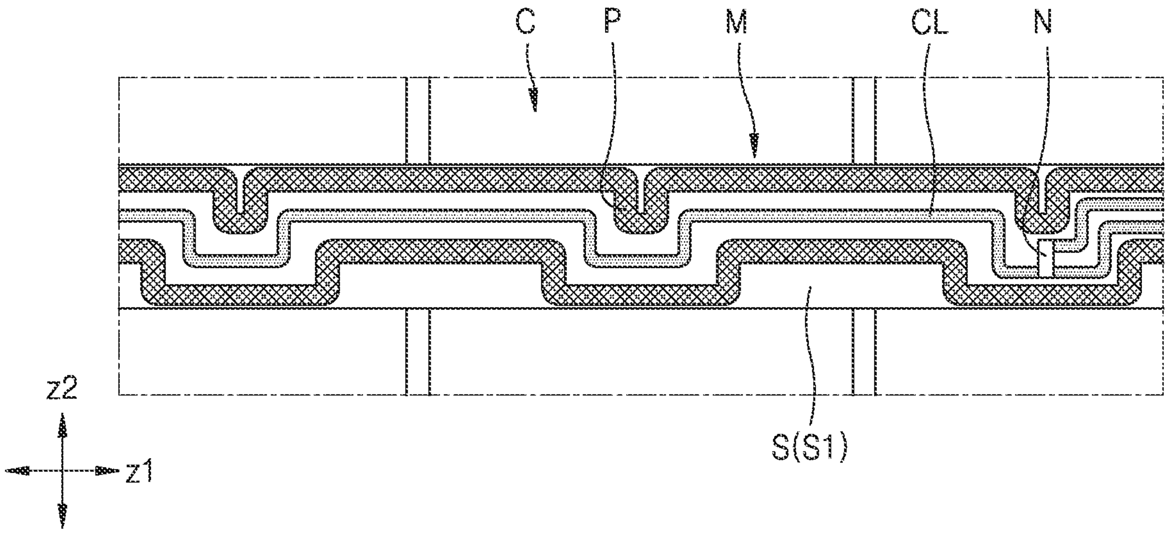
Figure 8D:
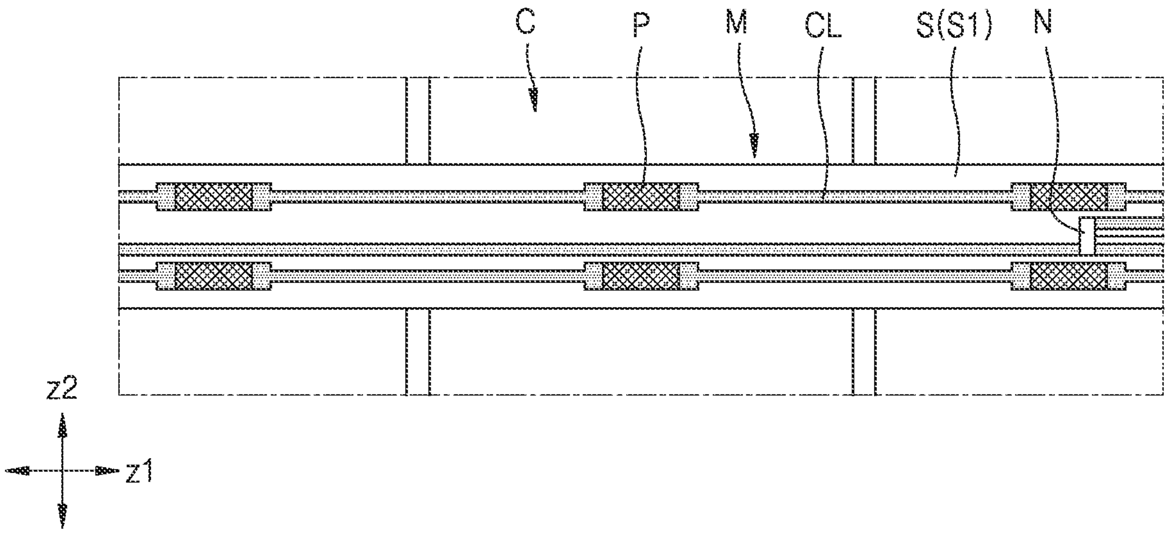

Referring to FIGS. 8A through 8D, according to an embodiment of the disclosure, the first type temperature measurement element P and the second type temperature measurement element N may be realized in various suitable forms. For example, the first type temperature measurement element P may be patterned on the common base substrate S by using a print screen (e.g., refer to FIGS. 8A and 8B), or may be mounted on the common base substrate S in a form of a chip (e.g., refer to FIG. 8D). Also, the second type temperature measurement element N may be mounted on the common base substrate S in a form of a chip (e.g., refer to FIGS. 8A through 8D). Here, a conductive line CL may be patterned on the common base substrate S, and the first type temperature measurement element P patterned by using the print screen may be arranged (e.g., refer to FIGS. 8A and 8B) to be connected to the conductive line CL, or the second type temperature measurement element N in a form of a chip may be mounted (e.g., refer to FIGS. 8A through 8D) to be connected to the conductive line CL. Referring to FIGS. 8A and 8B, according to some embodiments, the first measurement circuit unit M1 and second measurement circuit unit M2 may be supported on the common base substrate S by using the flexible insulating film S1 as the common base substrate S (e.g., see FIG. 8A), or may be supported on the common base substrate S by using the rigid insulating substrate S2 as the common base substrate S (e.g., see FIG. 8B). Also, the first type temperature measurement element P may be patterned on the common base substrate S by using the print screen (e.g., see FIGS. 8A and 8B), or mounted in a form of a chip (e.g., see FIG. 8D), and the second type temperature measurement element N may be mounted on the common base substrate S in a form of a chip. Referring to FIG. 8C, in some embodiments, the first type temperature measurement element P may be patterned by the conductive line CL on the common base substrate S, and for example, a bent portion may be formed in a partial section of the conductive line CL to increase a resistance, such that a change in the resistance according to a temperature change may be easily measured.

According to an embodiment, the second type temperature measurement element N may be provided in a form of a chip, and may configure a dedicated second measurement circuit unit M2 for providing a separate measurement channel. Accordingly, the number of second type temperature measurement elements N may be less than that of the first type temperature measurement elements P, due to spatial restriction and/or channel restriction of the battery management system BMS that receives a signal of the second type temperature measurement element N through each corresponding measurement channel. However, according to various embodiments, the number of the first type temperature measurement elements P and the number of the second type temperature measurement elements N may be designed to be the same or substantially the same as each other.

Figure 9:
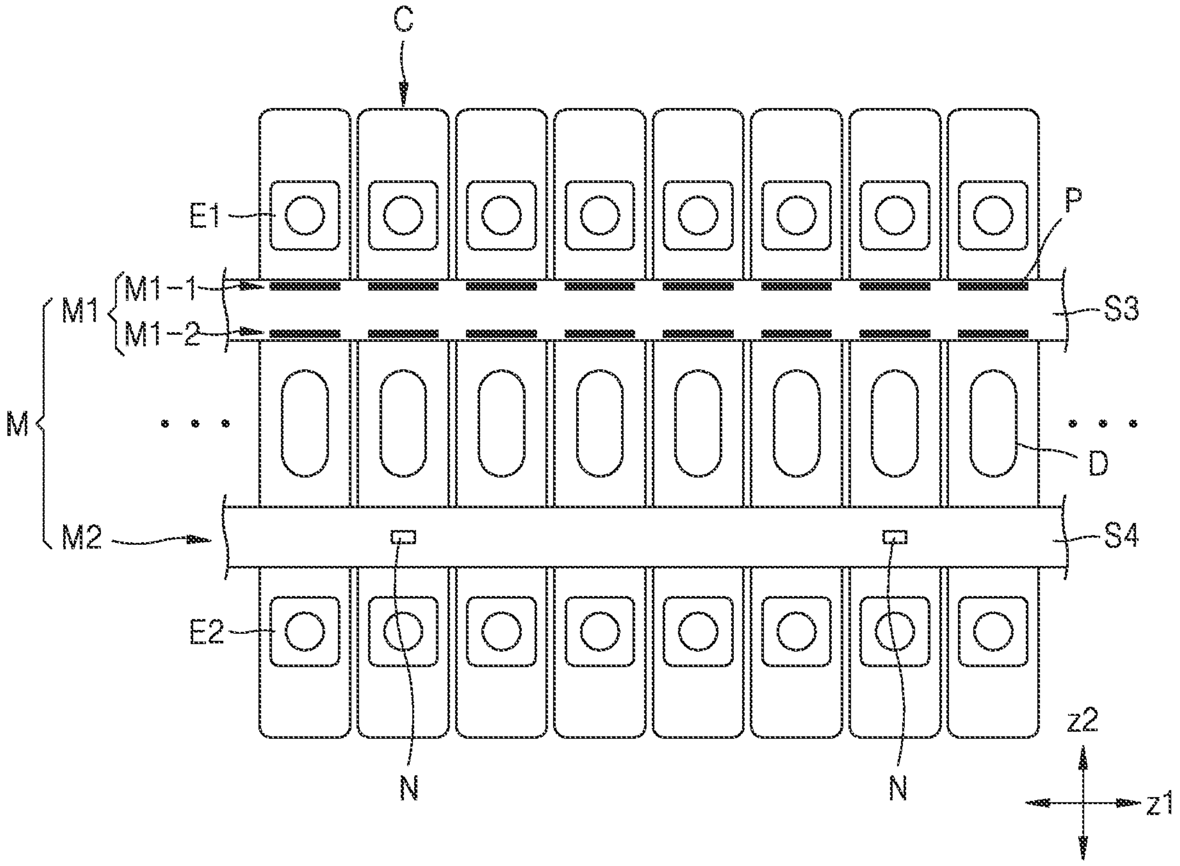
FIG. 9 illustrates a battery pack according to a modified embodiment of FIG. 3.

According to various embodiments, the first type temperature measurement element P and the second type temperature measurement element N may have the same structure or substantially the same structure as each other, or may have different structures from each other. The first type temperature measurement element P or the second type temperature measurement element N may be patterned or mounted in a form of a chip on the common base substrate S, or on individual base substrates S3 and S4 as shown in FIG. 9. According to an embodiment, the first type temperature measurement element P or the second type temperature measurement element N may be patterned by using the print screen or patterned by the conductive line CL including the bent portion.

Referring to FIGS. 1 and 2, according to an embodiment, the measurement circuit unit M including the first type temperature measurement element P and the second type temperature measurement element N may extend across the electrode surface U of the battery cell C in the first direction Z1. According to various embodiments, the measurement circuit unit M may extend across the wide side surface SS1, the narrow side surface SS2, or the bottom surface B, in addition to the electrode surface U of the battery cell C, and may be arranged to surround (e.g., around a periphery of) at least two of the electrode surface U, wide side surface SS1, narrow side surface SS2, or bottom surface B of the battery cell C.

FIG. 9 illustrates a battery pack according to a modified embodiment of FIG. 3. Referring to FIG. 9, the first measurement circuit unit M1 including the first type temperature measurement element P, and the second measurement circuit unit M2 including the second type temperature measurement element N may be formed on different individual base substrates S3 and S4 from each other, and for example, may be arranged on opposite sides of the vent holes D of the battery cells C.

In the embodiment shown in FIG. 9, the first measurement circuit unit M1 may include the pair of first measurement circuit units M1 (e.g., the (1-1)th measurement circuit unit M1-1 and (1-2)th measurement circuit unit M1-2) arranged on opposite sides of the base substrate S3 (e.g., in the z2 direction), but according to various embodiments, the first measurement circuit unit M1 may include a single first measurement circuit unit M1 arranged at a center location of the base substrate S3. Even in this case, the first measurement circuit unit M1 and second measurement circuit unit M2 may be arranged on opposite sides of the battery cells C, respectively, based on the vent holes D of the battery cells C.

In the embodiment shown in FIG. 9, the first measurement circuit units M1 and the second measurement circuit units M2 may be formed together on the electrode surfaces U of the battery cells C, but the first measurement circuit units M1 and second measurement circuit units M2 may be arranged on different surfaces from each other from among the electrode surfaces U, wide side surfaces SS1, narrow side surfaces SS2, and bottom surfaces B of the battery cells C. At least some of the first measurement circuit units M1 and the second measurement circuit units M2 may be arranged on different surfaces from each other while surrounding (e.g., around a periphery of) other neighboring surfaces.

Figure 10:
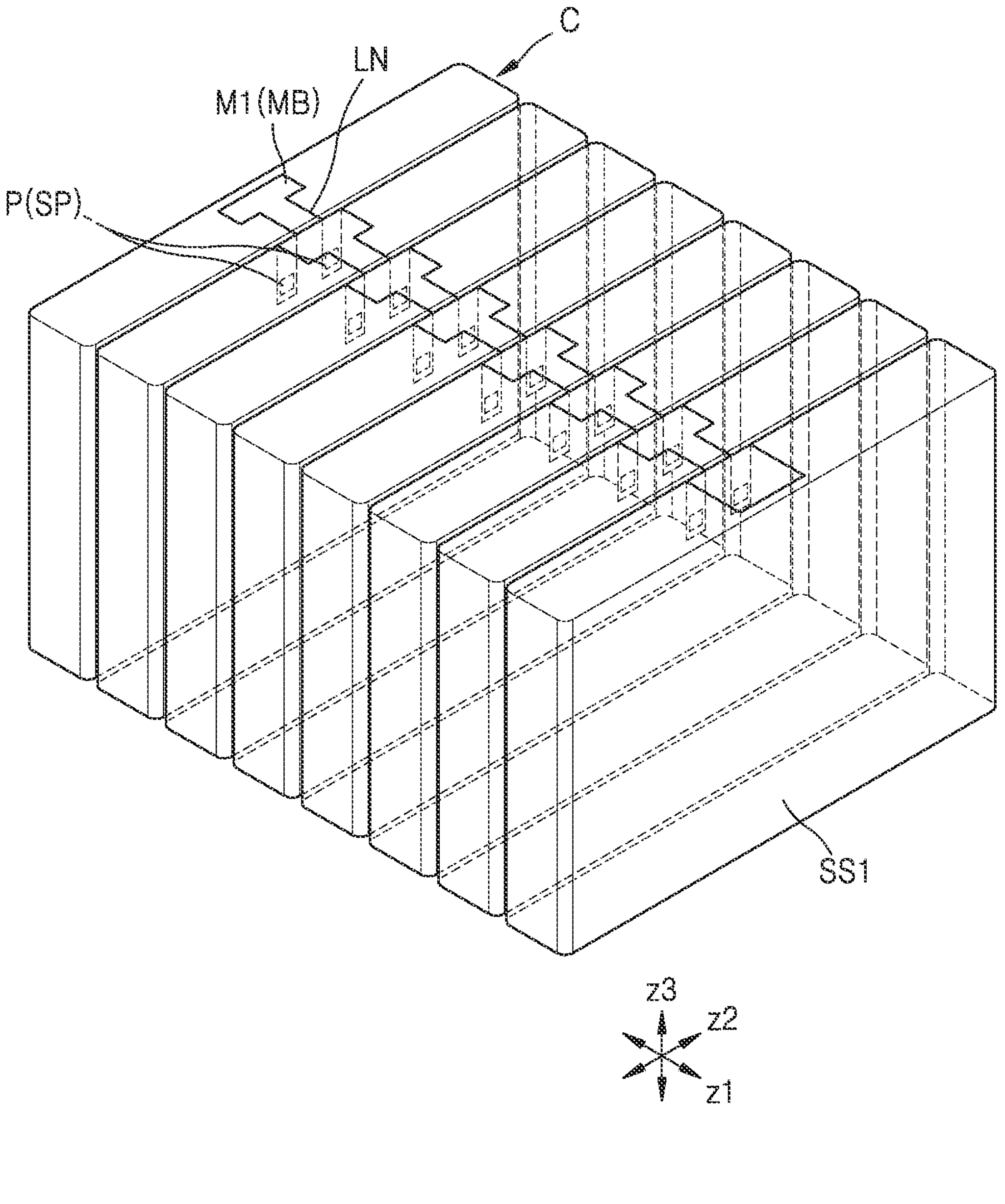
FIG. 10 illustrates a battery pack according to a modified embodiment of FIG. 1.

FIG. 10 illustrates a battery pack according to a modified embodiment of FIG. 1. Referring to FIG. 10, the battery pack may include the first measurement circuit unit M1 including the first type temperature measurement element P provided between the wide side surfaces SS1 of the neighboring battery cells C that face each other in the first direction Z1 along which the battery cells C are arranged. The first measurement circuit unit M1 may be formed by separating a measurement portion SP where the first type temperature measurement element P (or a pair of first type temperature measurement elements P) is arranged from a body portion MB of the first measurement circuit unit M1 through a cut line LN. The measurement portion SP separated from the body portion MB of the first measurement circuit unit M1 may then be arranged between the wide side surfaces SS1 of the neighboring battery cells C.

The battery pack of FIG. 10 may include the battery cell C having a flexible pouch shape, and in this case, the first measurement circuit unit M1 may be stably arranged between the wide side surfaces SS1 of the battery cells C, which occupy relatively large areas. According to various embodiments, like the first measurement circuit unit M1, the second measurement circuit unit M2 may include the measurement portion SP separated from the body portion MB through the cut line LN, and may be formed by providing the measurement portion SP between the neighboring battery cells C arranged along the first direction Z1.

Referring to FIGS. 1 and 2, according to an embodiment, the measurement circuit unit M including the first type temperature measurement element P and the second type temperature measurement element N may extend across the electrode surface U of the battery cell C along the first direction Z1. According to various embodiments, the measurement circuit unit M may extend across the wide side surface SS1, the narrow side surface SS2, or the bottom surface B, in addition to the electrode surface U of the battery cell C, and may be arranged to surround (e.g., around a periphery of) at least two of the electrode surface U, wide side surface SS1, narrow side surface SS2, or bottom surface B of the battery cell C.

Figure 11:
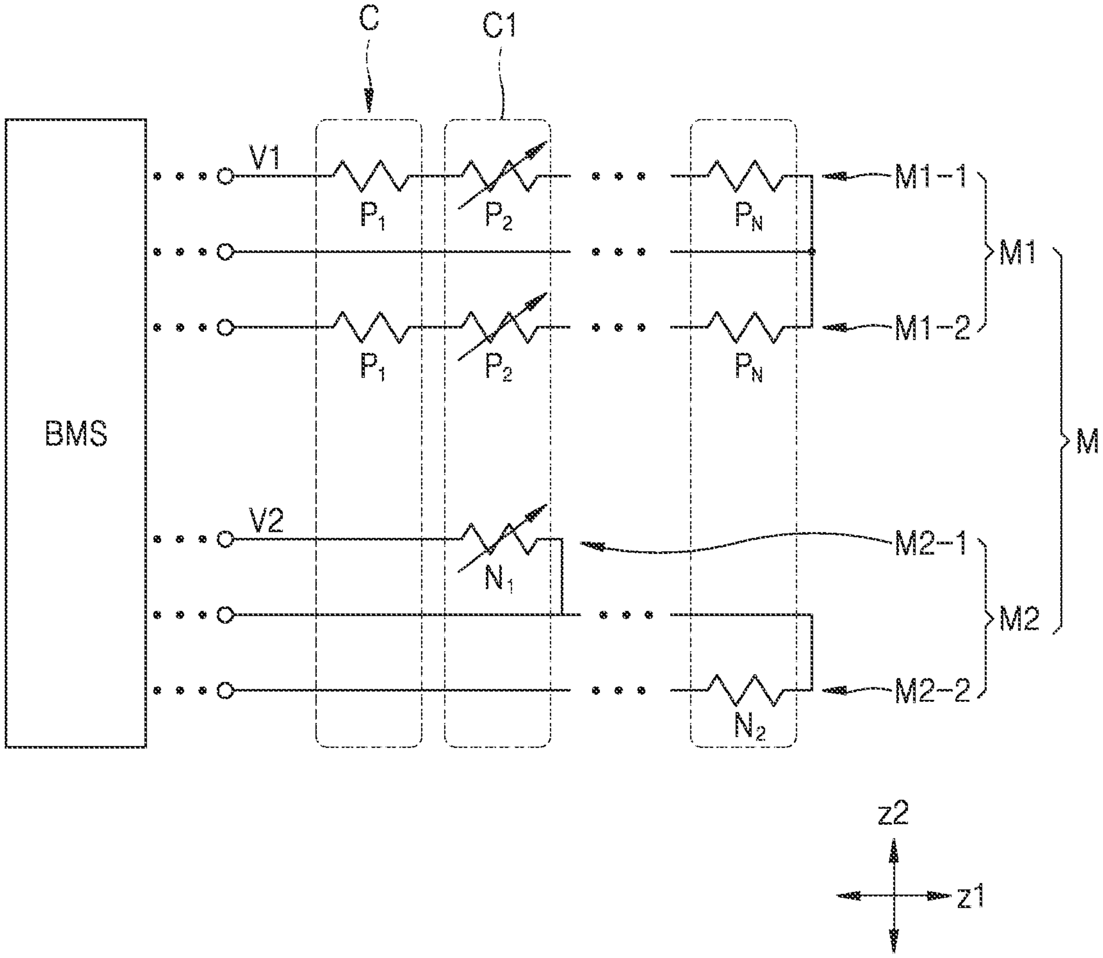
FIG. 11 illustrates a connection state of a first measurement circuit unit and a second measurement circuit unit.

FIG. 11 illustrates a connection state of the first measurement circuit unit M1 and the second measurement circuit unit M2. Referring to FIG. 11, the battery pack according to an embodiment may further include the battery management system BMS connected to ends (e.g., both ends or opposite ends) of the first measurement circuit unit M1 and the second measurement circuit unit M2, and for determining an abnormal temperature or overheating of the battery cell C, based on outputs of the first measurement circuit unit M1 and second measurement circuit unit M2. The first measurement circuit unit M1 may include the pair of first measurement circuit units M1 (e.g., the (1-1)th measurement circuit unit M1-1 and (1-2)th measurement circuit unit M1-2) that are connected to each other in parallel with respect to the battery management system BMS. Similarly, the second measurement circuit unit M2 may include the pair of second measurement circuit units M2 (e.g., the (2-1)th measurement circuit unit M2-1 and (2-2)th measurement circuit unit M2-2) that are connected to each other in parallel with respect to the battery management system BMS. Here, each of the pair of first measurement circuit units M1 may include the plurality of first type temperature measurement elements P (e.g., the first type temperature measurement elements $P_1$ through $P_N$, where N is a natural number greater than 1) connected to each other in series in the first direction Z1 along which the battery cells C are arranged. The pair of second measurement circuit units M2 may each include a single second type temperature measurement element N (e.g., the second type temperature measurement elements $N_1$ and $N_2$, respectively). According to an embodiment, an output of the first measurement circuit unit M1 may be used to calculate a first measurement value V1 including a resistance change that is increased according to overheating, through the first type temperature measurement element $P_2$ allocated to an overheated battery cell C1 from among the first type temperature measurement elements P that are connected in series. On the other hand, an output of the second measurement circuit unit M2 may be used to calculate a second measurement value V2 including a resistance change that is decreased according to overheating, through the second type temperature measurement element $N_1$ corresponding to the overheated battery cell C1 according to measurement locations of the second type temperature measurement elements N included in the second measurement circuit units M2, or to calculate the second measurement value V2 that does not include the resistance change according to overheating, through the second type temperature measurement element $N_2$ free from the overheated battery cell C1.

According to an embodiment, overheating of the battery cell C is determined from a difference value (e.g., V1−V2) between the first measurement value V1 and second measurement value V2 of the first measurement circuit unit M1 and second measurement circuit unit M2. In this case, by determining whether the battery cell C is overheated by using an absolute value of the difference value (e.g., V1−V2) between the first measurement value V1 and second measurement value V2 of the first measurement circuit unit M1 and second measurement circuit unit M2, the battery cell C may be determined to be overheated when the first measurement value V1 is greater than the second measurement value V2 (e.g., when the difference value (V1−V2) between the first measurement value V1 and second measurement value V2 is greater than a suitable threshold value (e.g., a pre-set or predetermined threshold value)), or when the second measurement value V2 is greater than the first measurement value V1 (e.g., when a difference value (V2−V1) between the second measurement value V2 and first measurement value V1 is greater than the suitable threshold value (e.g., the pre-set or predetermined threshold value)).

When the first measurement value V1 is greater than the second measurement value V2 (e.g., when the difference value (V1−V2) between the first measurement value V1 and second measurement value V2 is greater than the suitable threshold value), the second type temperature measurement element N may be allocated to the overheated battery cell C1, or the battery cell C1 to which the second type temperature measurement element N is allocated is overheated. Here, the first type temperature measurement element P and the second type temperature measurement element N may both detect overheating of the battery cell C, and due to an increment of the resistance of the first type temperature measurement element P and a decrement of the resistance of the second type temperature measurement element N caused by the overheating of the battery cell C, the first measurement value V1 of the first measurement circuit unit M1 including the first type temperature measurement element P and the second measurement value V2 of the second measurement circuit unit M2 including the second type temperature measurement element N may satisfy a relationship of the first measurement value V1 is greater than the second measurement value V2. Also, when the difference value (V1−V2) between the first measurement value V1 and second measurement value V2 is equal to or greater than the suitable threshold value (e.g., the pre-set or predetermined threshold value), it may be determined that the battery cell C is overheated.

According to an embodiment, the first measurement value V1 detects the overheated battery cell C1 and the battery cell C that is not overheated together, whereas the second measurement value V2 mainly detects the overheated battery cell C1, and thus, the decrement of the resistance of the second type temperature measurement element N reflected to the second measurement value V2 is more noticeable than the increment of the resistance of the first type temperature measurement element P reflected to the first measurement value V1. Accordingly, the difference value (V1−V2) between the first measurement value V1 and second measurement value V2 is increased, and the battery cell C is determined to be overheated when the difference value (V1−V2) is equal to or greater than the suitable threshold value (e.g., the pre-set or predetermined threshold value).

According to an embodiment, because the first measurement value V1 is indicated as the combined resistance of the first type temperature measurement elements P of the first measurement circuit unit M1, which are connected in series, the first measurement value V1 is determined as a first conversion measurement value. The second measurement value V2 compared with the first measurement value V1 is converted into a second conversion measurement value considering the resistance of the second type temperature measurement element N together with the number of first type temperature measurement elements P (or the number of battery cells C). Then, a difference value between the first conversion measurement value and second conversion measurement value may be compared with the threshold value.

The first conversion measurement value and the second conversion measurement value to be compared with the threshold value may be values obtained according to the number of all battery cells C. At this time, the first conversion measurement value includes resistance values of both the overheated battery cell C1 (e.g., the resistance increased due to overheating) and the battery cell C that is not overheated (e.g., no increase in resistance due to overheating), but for example, the second conversion measurement value may correspond to a value obtained by multiplying the resistance value of the overheated battery cell C1 (e.g., the resistance decreased due to overheating) by the number of battery cells C. Accordingly, the decrement of the second conversion measurement value is more noticeable than the increment of the first conversion measurement value, and thus, the difference value between the first conversion measurement value and the second conversion measurement value may be increased due to overheating of the battery cell C. As such, according to an embodiment, an overheating signal of the battery cell C may be amplified by using the first measurement value V1 and the second measurement value V2, or the first conversion measurement value and the second conversion measurement value, considering the number of all battery cells C, rather than outputs of the first type temperature measurement element P and second type temperature measurement element N, and accordingly, overheating of the battery cell C may be detected without omission.

When the first measurement value V1 is less than the second measurement value V2 (e.g., when a difference value (V2−V1) between the second measurement value V2 and first measurement value V1 is greater than the suitable threshold value), the second type temperature measurement element N may be outside a measurement location of the overheated battery cell C1, or a battery cell other than the battery cell C to which the second type temperature measurement element N is allocated is overheated. Here, the first measurement value V1 of the first type temperature measurement element P, which detected the increment of the resistance of the overheated battery cell C1, and the second measurement value V2, which did not detect the decrement of the resistance of the overheated battery cell C1, may satisfy a relationship of the first measurement value V1 is less than the second measurement value V2. Also, when the difference value (V2−V1) between the first measurement value V1 and second measurement value V2 is equal to or greater than the suitable threshold value (e.g., the pre-set or predetermined threshold value), it may be determined that the battery cell C is overheated.

According to an embodiment, even when the first measurement value V1 increases due to the overheated battery cell C1, the second measurement value V2 may not detect overheating of the battery cell C, and thus, may have a relatively large resistance that is not decreased. Thus, the relationship of the first measurement value V1 is less than the second measurement value V2 may be satisfied. As described above, according to an embodiment, the first conversion measurement value and second conversion measurement value obtained by considering the number of all battery cells C included in the battery pack may be used considering a difference between the numbers of the first type temperature measurement element P and the second type temperature measurement element N. The first measurement circuit unit M1 including the same number of first type temperature measurement elements P as that of all the battery cells C may be used as the first conversion measurement value, and for example, the second conversion measurement value may be obtained by multiplying the second measurement value V2 of the second measurement circuit unit M2 including the single second type temperature measurement element N by the number of battery cells C. Here, the first conversion measurement value includes resistance values of both the overheated battery cell C1 (e.g., the resistance increased due to overheating) and the battery cell C that is not overheated (e.g., no increase in resistance due to overheating), but for example, the second conversion measurement value may be represented by a value obtained by multiplying a resistance value of the battery cell C that is not overheated (e.g., no decrease in resistance due to overheating) by the number of battery cells C. Accordingly, the second conversion measurement value without decrease due to overheating of the battery cell C may be relatively noticeable compared to the first conversion measurement value to which the increment of the overheated battery cell C1 is reflected.

According to an embodiment, while determining whether the battery cell C is overheated, determining whether the first measurement value is equal to or greater than a trigger point corresponding to the inflection point CP of the first type temperature measurement element P may be performed before or after determining whether the battery cell C is overheated based on the difference value (V1−V2) between the first measurement value V1 and second measurement value V2, or the difference value between the first conversion measurement value and second conversion measurement value, and supplement the determination based on the difference value (V1−V2). Also, an error of determining that the battery cell C is overheated even when the battery cell C is not overheated may be prevented when the first measurement value V1 is less than the second measurement value V2 (e.g., when a difference value (V2−V1) between the second measurement value V2 and first measurement value V1 is greater than the suitable threshold value).

According to an embodiment, calculating temperature information based on the first measurement value V1 and the second measurement value V2, or the first conversion measurement value and the second conversion measurement value, may be further performed. Overheating may be supplementary determined by using the temperature information. For example, determining overheating by using the temperature information may be performed before or after determining overheating based on the difference value (V1−V2) between the first measurement value V1 and second measurement value V2, or the difference value between the first conversion measurement value and second conversion measurement value, and supplement the determination based on the difference value (V1−V2). Also, an error of determining that the battery cell C is overheated even when the battery cell C is not overheated may be prevented when the first measurement value V1 is less than the second measurement value V2 (e.g., when a difference value (V2−V1) between the second measurement value V2 and first measurement value V1 is greater than the suitable threshold value).

Figure 12:
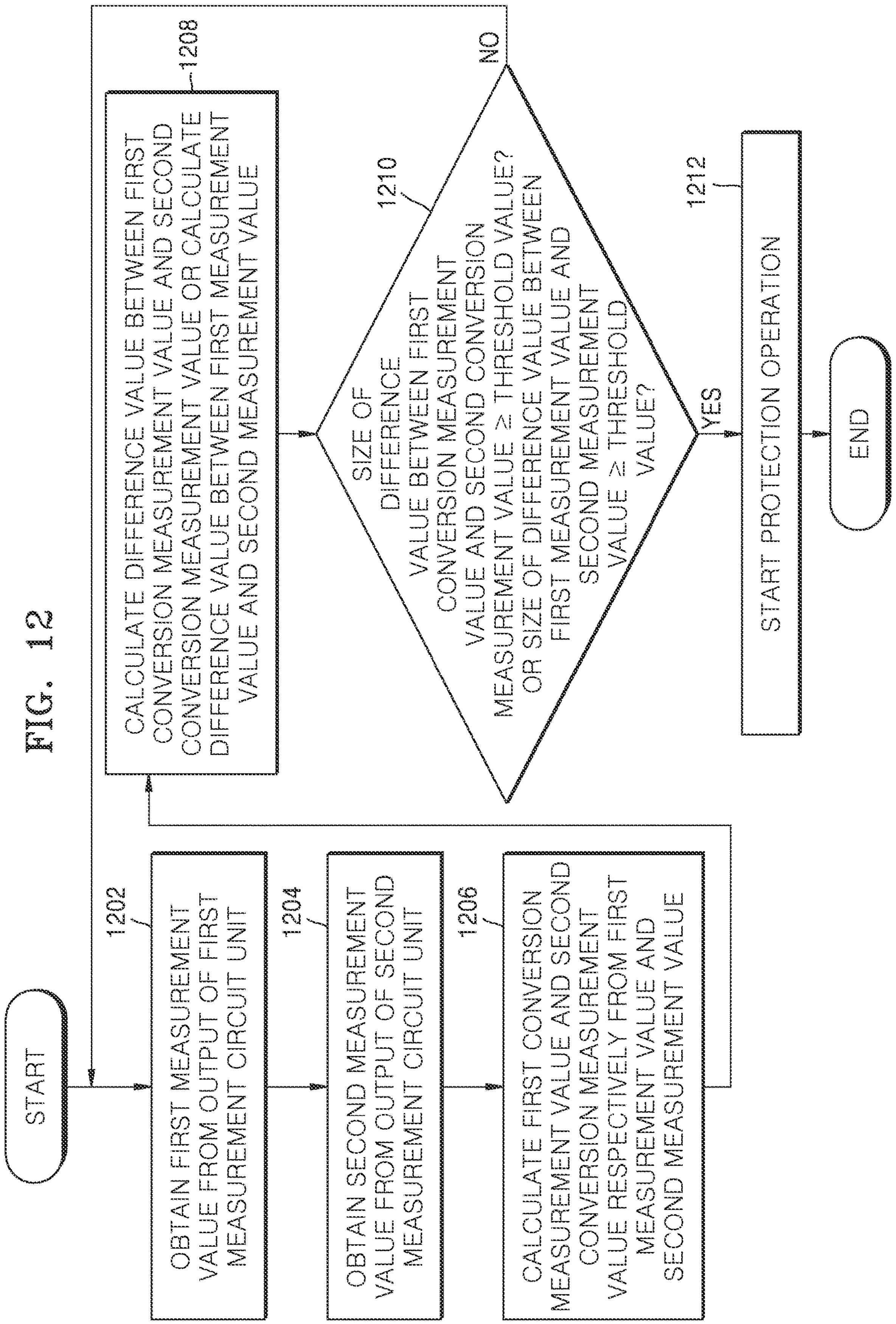
FIG. 12 is a flowchart of a control method for a battery pack, according to an embodiment.
Figure 13:
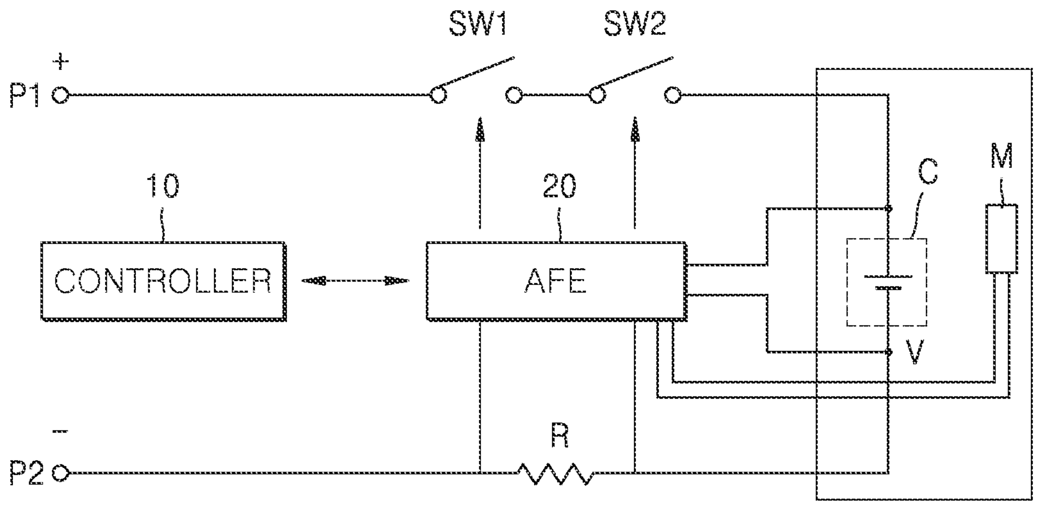
FIG. 13 illustrates a schematic configuration of a battery management system, according to an embodiment.

FIG. 12 is a flowchart of a control method for the battery pack, according to an embodiment. FIG. 13 illustrates a schematic configuration of the battery management system BMS, according to an embodiment.

Hereinafter, the control method for the battery pack, according to an embodiment, will be described in more detail with reference to FIG. 12.

The control method according to an embodiment, for the battery pack including the battery cells C, and the first measurement circuit unit M1 and the second measurement circuit unit M2 for measuring the temperature information of the battery cells C, and including the first type temperature measurement element P and the second type temperature measurement element N, respectively, having different characteristics from each other of a resistance change according to a temperature change, may determine whether the battery cell C is overheated by using the difference value (V1−V2) between the first measurement value V1 based on the output of the first measurement circuit unit M1 and the second measurement value V2 based on the output of the second measurement circuit unit M2.

According to an embodiment, an abnormal temperature or overheating of the battery cell C may be precisely detected by using the first measurement circuit unit M1 and the second measurement circuit unit M2 including the first type temperature measurement element P and second type temperature measurement element N having different resistance characteristics from each other.

According to an embodiment, in the first type temperature measurement element P, a profile of the resistance change according to the temperature change may display a nonlinear rapid change above the inflection point CP, and in the second type temperature measurement element N, a profile of the resistance change according to the temperature change may display a linear gradual change. According to an embodiment, it is determined whether the first measurement value V1 is equal to or greater than the trigger point corresponding to the inflection point CP of the first type temperature measurement element P, and when the first measurement value V1 is equal to or greater than the trigger point and the second measurement value V2 is equal to or greater than the threshold value, the battery cell C may be determined to be overheated.

According to an embodiment, the difference value (V1−V2) calculated from the first measurement value V1 from the first measurement circuit unit M1 including the first type temperature measurement element P and the second measurement value V2 from the second measurement circuit unit M2 is compared with the threshold value, and an abnormal temperature or overheating of the battery cell C may be determined based on a result of the comparing. Hereinafter, determination on overheating of the battery cell C according to the comparison of the difference value (V1−V2) between the first measurement value V1 and second measurement value V2 with the threshold value will be described in more detail.

The control method for the battery pack, according to an embodiment, may be performed under control by the battery management system BMS or a controller 10 of FIG. 13 configured to control the overall operations of the battery management system BMS. A schematic configuration of the battery management system BMS will be described in more detail below with reference to FIG. 13.

According to an embodiment, the control method may start, and the first measurement value V1 may be obtained from the output of the first measurement circuit unit M1 at operation 1202, which may correspond to the resistance of the first measurement circuit unit M1 or the resistance of the first type temperature measurement element P included in the first measurement circuit unit M1, or which may correspond to a voltage drop of the first measurement circuit unit M1. Similarly, the second measurement value V2 may be obtained from the output of the second measurement circuit unit M2 at operation 1204, which may correspond to the resistance of the second measurement circuit unit M2 or the resistance of the second type temperature measurement element N included in the second measurement circuit unit M2, or which may correspond to a voltage drop of the second measurement circuit unit M2.

The controller 10 of FIG. 13 may calculate the first measurement value V1 from the output of the first measurement circuit unit M1, and similarly, may calculate the second measurement value V2 from the output of the second measurement circuit unit M2. Also, the controller 10 of FIG. 13 may calculate the first conversion measurement value from the first measurement value V1, and similarly, may calculate the second conversion measurement value from the second measurement value V2 at operation 1206.

According to a configuration of the measurement circuit unit M, according to an embodiment, the controller 10 of FIG. 13 may calculate the first measurement value V1 and the second measurement value V2, and the first conversion measurement value and second conversion measurement value via different methods. In the configuration of measurement circuit unit M shown in FIG. 6, the controller 10 of FIG. 13 may calculate, as the first measurement value V1, the combined resistance obtained by combining resistances of the plurality of first type temperature measurement elements P connected to each other in series between opposite ends of the first measurement circuit unit M1, and may calculate, as the second measurement value V2, the resistance of the second type temperature measurement element N connected between opposite ends of the second measurement circuit unit M2. Here, the controller 10 of FIG. 13 may perform the following calculation process by using the first measurement value V1 as the first conversion measurement value, and may calculate the second conversion measurement value through a separate conversion for the second measurement value V2. In more detail, the first conversion measurement value corresponds to the combined resistance obtained by combining the resistances of the plurality of first type temperature measurement elements P connected to each other in series between opposite ends of the first measurement circuit unit M1, and thus, the second conversion measurement value may also be calculated as the combined resistance obtained by combining resistances of the same number of second type temperature measurement elements N as that of the first type temperature measurement elements P. In more detail, the controller 10 of FIG. 13 may calculate the second conversion measurement value by multiplying the resistance (e.g., a representative value described in more detail below) of the single second type temperature measurement element N connected between opposite ends of the second measurement circuit unit M2 by the number of first type temperature measurement elements P.

According to an embodiment, there may be two or more second measurement circuit units M2, and different second measurement values V2 may be obtained based on outputs of the different second type temperature measurement elements N included in the different second measurement circuit units M2. One second measurement value V2 selected from the different second measurement values V2, for example, the second measurement value V2 having a largest value, may be used as the representative value, and the second conversion measurement value may be calculated by multiplying the representative value by the number of first type temperature measurement elements P. According to various embodiments, the controller 10 of FIG. 13 may use an average value of the different second measurement values V2 as the representative value, and calculate the second conversion measurement value by multiplying the representative value by the number of first type temperature measurement elements P.

According to an embodiment, the number of first type temperature measurement elements P connected to each other between opposite ends of the first measurement circuit unit M1 may be the same or substantially the same as the number of all battery cells C arranged along the first direction Z1, and for example, the first type temperature measurement elements P may be allocated to the battery cells C arranged along the first direction Z1, respectively. In such a configuration, the controller 10 of FIG. 13 may obtain the second conversion measurement value by multiplying the representative value obtained from the resistances of the second type temperature measurement elements N by the number of battery cells C, instead of the number of first type temperature measurement elements P. According to an embodiment, the first measurement circuit unit M1 may include the pair of first measurement circuit units M1, each including the same number of the first type temperature measurement elements P as the battery cells C, so as to provide redundancy in preparation for disconnection. Here, the number of first type temperature measurement elements P may denote the number of battery cells C or the number of first type temperature measurement elements P included in each first measurement circuit unit M1, the number of first type temperature measurement elements P included in the pair of first measurement circuit units M1 may denote a multiple of the number of battery cells C, and the number of first type temperature measurement elements P included in the pair of first measurement circuit units M1 may not be considered while calculating the second conversion measurement value.

In the configuration of measurement circuit unit M shown in FIG. 7, the controller 10 of FIG. 13 may calculate, as the first measurement value V1, total combined resistance obtained by combining the combined resistances, in which the resistances of the plurality of first type temperature measurement elements P connected to each other in series between opposite ends of the first measurement circuit unit M1 (e.g., the (1-1)th measurement circuit unit M1-1) are combined with each other, with the combined resistance, in which the resistances of the plurality of first type temperature measurement elements P connected to each other in series between opposite ends of another first measurement circuit unit M1 (e.g., the (1-2)th measurement circuit unit M1-2) are combined. Also, the controller 10 of FIG. 13 may calculate, as the second measurement value V2, the resistance of the second type temperature measurement element N connected between the opposite ends of the second measurement circuit unit M2. Here, the controller 10 of FIG. 13 may perform the following calculation process by using the first measurement value V1 as the first conversion measurement value, and calculate the second conversion measurement value through separate conversion for the second measurement value V2. In more detail, the first conversion measurement value corresponds to the total combined resistance obtained by combining the combined resistance, in which the resistances of the plurality of first type temperature measurement elements P connected to each other in series between opposite ends of the first measurement circuit unit M1 are combined, with the combined resistance, in which the resistances of the plurality of first type temperature measurement elements P connected to each other in series between opposite ends of the other first measurement circuit unit M1 are combined, and thus, the second conversion measurement value may also be calculated as combined resistance obtained by combining resistances of the same number of second type temperature measurement elements N as that of the first type temperature measurement elements P. In more detail, the controller 10 of FIG. 13 may calculate the second conversion measurement value by multiplying the resistance (e.g., the representative value described below) of the single second type temperature measurement element N connected between opposite ends of the second measurement circuit unit M2 by the number of first type temperature measurement elements P.

Regarding the number of first type temperature measurement elements P for calculating the second conversion measurement value, the first measurement circuit unit M1 may include the pair of different first measurement circuit units M1 so as to provide redundancy in preparation for disconnection. The first measurement circuit unit M1 may include the (1-1)th measurement circuit unit M1-1 including the plurality of first type temperature measurement elements P allocated to the front battery cells C in the first direction Z1, and the (1-2)th measurement circuit unit M1-2 including the plurality of first type temperature measurement elements P allocated to the rear battery cells C in the first direction Z1. The number of first type temperature measurement elements P may correspond to a number obtained by adding the number of first type temperature measurement elements P included in the (1-1)th measurement circuit unit M1-1 and the number of first type temperature measurement elements P included in the (1-2)th measurement circuit unit M1-2. According to an embodiment, the same number of first type temperature measurement elements P as that of the battery cells C arranged along the first direction Z1 may be provided, and the first type temperature measurement elements P may be respectively allocated to the battery cells C arranged along the first direction Z1. For example, the battery cells C arranged along the first direction Z1 may be halved, and the first type temperature measurement elements P of the (1-1)th measurement circuit unit M1-1 may be allocated to the front half of the battery cells C, and the first type temperature measurement elements P of the (1-2)th measurement circuit unit M1-2 may be allocated to the rear half of the battery cells C. Here, the total number of first type temperature measurement elements P may be the same as the number of battery cells C, and may correspond to the number obtained by adding the numbers of first type temperature measurement elements P included in the (1-1)th measurement circuit unit M1-1 and (1-2)th measurement circuit unit M1-2.

Regarding the representative value of the second type temperature measurement elements N for calculating the second conversion measurement value, there may be two or more second measurement circuit units M2, and one second measurement value V2 selected from among the different second measurement values V2, for example, such as the second measurement value V2 having a largest value, may be used as the representative value, and the second conversion measurement value may be calculated by multiplying the representative value by the number of first type temperature measurement elements P. According to various embodiments, the controller 10 of FIG. 13 may use an average value of the different second measurement values V2 as the representative value, and calculate the second conversion measurement value.

As will be described in more detail below, according to an embodiment, an abnormal temperature or overheating of the battery cell C may be sensed based on the difference value between the first conversion measurement value and second conversion measurement value. According to various embodiments, the number of first type temperature measurement elements P and the number of second type temperature measurement elements N may be the same or substantially the same as each other, and the first type temperature measurement elements P connected between opposite ends of the first measurement circuit unit M1 and the second type temperature measurement elements N connected between opposite ends of the second measurement circuit unit M2 may be connected in various suitable manners, such as in series or in parallel. Thus, according to various embodiments, the difference value between the first conversion measurement value and second conversion measurement value may be comprehensively represented as the difference value (V1−V2) between the first measurement value V1 and second measurement value V2. As used in the present specification, the difference value between the first conversion measurement value and the second conversion measurement value includes a matching of the numbers of first type temperature measurement element P and the second type temperature measurement element N to be the same with each other, and more broadly, may be represented by the difference value (V1−V2) between the first measurement value V1 and second measurement value V2. Hereinafter, to prevent confusion before and after conversion, the difference value between the first conversion measurement value and second conversion measurement value is described, instead of the difference value (V1−V2) between the first measurement value V1 and second measurement value V2, but more broadly, the difference value between the first conversion measurement value and second conversion measurement value may be comprehensively represented by the difference value (V1−V2) between the first measurement value V1 and second measurement value V2. For reference, according to an embodiment, the difference value between the first conversion measurement value and second conversion measurement value or the difference value (V1−V2) between the first measurement value V1 and second measurement value V2 may be considered only quantitatively and positive(+)/negative(−) thereof may not be referred to. In this regard, the difference value may be represented by an absolute value of the difference value between the first conversion measurement value and second conversion measurement value, and the controller 10 of FIG. 13 may define the difference value as data having only a size without a sign or convert the difference value into an absolute value through a function, and compare the difference value with a threshold value in size as described below.

Referring to FIG. 11, according to an embodiment, overheating of the battery cell C is determined from the difference value (V1−V2) between the first measurement value V1 and the second measurement value V2 of the first measurement circuit unit M1 and the second measurement circuit unit M2. In this case, by determining whether the battery cell C is overheated by using the absolute value of the difference value (V1−V2) between the first measurement value V1 and the second measurement value V2 of the first measurement circuit unit M1 and the second measurement circuit unit M2, the battery cell C may be determined to be overheated when the first measurement value V1 is greater than the second measurement value V2 (e.g., when the difference value (V1−V2) between the first measurement value V1 and second measurement value V2 is greater than the threshold value), or when the second measurement value V2 is greater than the first measurement value V1 (e.g., when a difference value (V2−V1) between the second measurement value V2 and first measurement value V1 is greater than the threshold value.

When the first measurement value V1 is greater than the second measurement value V2 (e.g., when the difference value (V1−V2) between the first measurement value V1 and second measurement value V2 is greater than the threshold value), the second type temperature measurement element N may be allocated to the overheated battery cell C1 or the battery cell C1 to which the second type temperature measurement element N is allocated is overheated. Here, the first type temperature measurement element P and the second type temperature measurement element N may both detect overheating of the battery cell C, and due to the increment of the resistance of the first type temperature measurement element P and the decrement of the resistance of the second type temperature measurement element N caused by the overheating of the battery cell C, the first measurement value V1 of the first measurement circuit unit M1 including the first type temperature measurement element P and the second measurement value V2 of the second measurement circuit unit M2 including the second type temperature measurement element N may satisfy the relationship of the first measurement value V1 is greater the second measurement value V2. Also, when the difference value (V1−V2) between the first measurement value V1 and second measurement value V2 is equal to or greater than the threshold value, it may be determined that the battery cell C is overheated.

According to an embodiment, the first measurement value V1 detects the overheated battery cell C1 and the battery cell C that is not overheated together, whereas the second measurement value V2 mainly detects the overheated battery cell C1, and thus, the decrement of the resistance of the second type temperature measurement element N reflected to the second measurement value V2 is more noticeable than the increment of the resistance of the first type temperature measurement element P reflected to the first measurement value V1. Accordingly, the difference value (V1−V2) between the first measurement value V1 and the second measurement value V2 is increased, and the battery cell C is determined to be overheated when the difference value (V1−V2) is equal to or greater than the threshold value.

According to an embodiment, because the first measurement value V1 is indicated as the combined resistance of the first type temperature measurement elements P of the first measurement circuit unit M1, which are connected in series, the first measurement value V1 is determined as the first conversion measurement value. The second measurement value V2 compared with the first measurement value V1 is converted into the second conversion measurement value considering the resistance of the second type temperature measurement element N together with the number of first type temperature measurement elements P (or the number of battery cells C). Then, the difference value between the first conversion measurement value and second conversion measurement value may be compared with the threshold value.

The first conversion measurement value and second conversion measurement value to be compared with the threshold value may be values obtained according to the number of all battery cells C, considering the number of all battery cells C. In this case, the first conversion measurement value includes resistance values of both the overheated battery cell C1 (resistance increased due to overheating) and the battery cell C that is not overheated (no increase in resistance due to overheating), but for example, the second conversion measurement value may correspond to a value obtained by multiplying the resistance value of the overheated battery cell C1 (resistance decreased due to overheating) by the number of battery cells C. Accordingly, the decrement of the second conversion measurement value is more noticeable than the increment of the first conversion measurement value, and thus, the difference value between the first conversion measurement value and second conversion measurement value may be increased due to overheating of the battery cell C. As such, according to an embodiment, an overheating signal of the battery cell C may be amplified by using the first measurement value V1 and second measurement value V2, or the first conversion measurement value and second conversion measurement value considering the number of all battery cells C, rather than outputs of the first type temperature measurement element P and second type temperature measurement element N, and accordingly, overheating of the battery cell C may be detected without omission.

When the first measurement value V1 is less than the second measurement value V2 (e.g., when the difference value (V2−V1) between the second measurement value V2 and first measurement value V1 is greater than the threshold value), the second type temperature measurement element N may be outside a measurement location of the overheated battery cell C1, or the battery cell C other than the battery cell C to which the second type temperature measurement element N is allocated is overheated. Here, the first measurement value V1 of the first type temperature measurement element P, which detected the increment of resistance of the overheated battery cell C1, and the second measurement value V2 which did not detect the decrement of resistance of the overheated battery cell C1 may satisfy the relationship of the first measurement value V1 is less than the second measurement value V2. Also, when the difference value (V2−V1) between the first measurement value V1 and second measurement value V2 is equal to or greater than the threshold value, it may be determined that the battery cell C is overheated.

According to an embodiment, even when the first measurement value V1 increases due to the overheated battery cell C1, the second measurement value V2 may not detect overheating of the battery cell C, and thus, may have relatively large resistance that is not decreased. Thus, the relationship of the first measurement value V1 is less than the second measurement value V2 may be satisfied. As described above, according to an embodiment, the first conversion measurement value and second conversion measurement value obtained by considering the number of all battery cells C included in the battery pack considering the difference between the numbers of the first type temperature measurement element P and the second type temperature measurement element N. The first measurement circuit unit M1 including the same number of first type temperature measurement elements P as that of all the battery cells C may be used as the first conversion measurement value, and for example, the second conversion measurement value may be obtained by multiplying the second measurement value V2 of the second measurement circuit unit M2 including the single second type temperature measurement element N by the number of battery cells C. Here, the first conversion measurement value includes resistance values of both the overheated battery cell C1 (resistance increased due to overheating) and the battery cell C that is not overheated (no increase in resistance due to overheating), but for example, the second conversion measurement value may be represented by a value obtained by multiplying a resistance value of the battery cell C that is not overheated (no decrease in resistance due to overheating) by the number of battery cells C. Accordingly, the second conversion measurement value without decrease due to overheating of the battery cell C may be relatively noticeable compared to the first conversion measurement value to which the increment of the overheated battery cell C1 is reflected.

According to an embodiment, while determining whether the battery cell C is overheated, determining whether the first measurement value is equal to or greater than the trigger point corresponding to the inflection point CP of the first type temperature measurement element P may be performed before or after determining whether the battery cell C is overheated based on the difference value (V1−V2) between the first measurement value V1 and second measurement value V2, or the difference value between the first conversion measurement value and second conversion measurement value, and supplement the determination based on the difference value (V1−V2). Also, an error of determining that the battery cell C is overheated even when the battery cell C is not overheated may be prevented or substantially prevented for example, when the first measurement value V1 is less than the second measurement value V2 (e.g., when a difference value (V2−V1) between the second measurement value V2 and first measurement value V1 is greater than the threshold value).

According to an embodiment, calculating the temperature information based on the first measurement value V1 and second measurement value V2, or the first conversion measurement value and second conversion measurement value, may be further performed. Overheating may be supplementary determined by using the temperature information. For example, determining overheating by using the temperature information may be performed before or after determining overheating based on the difference value (V1−V2) between the first measurement value V1 and second measurement value V2, or the difference value between the first conversion measurement value and second conversion measurement value, and supplement the determination based on the difference value (V1−V2). Also, an error of determining that the battery cell C is overheated even when the battery cell C is not overheated may be prevented or substantially prevented when the first measurement value V1 is less than the second measurement value V2 (e.g., when a difference value (V2−V1) between the second measurement value V2 and first measurement value V1 is greater than the threshold value).

According to an embodiment, the threshold value may be determined (e.g., may be set) as below. The threshold value is a value to be compared with the difference value (V1−V2) between the first measurement value V1 and the second measurement value V2, or with the difference value between the first conversion measurement value and the second conversion measurement value, and for example, may be determined as a difference value between first temperature data calculated from resistance of one group of first type temperature measurement elements P indicated by the first conversion measurement value and the second temperature data calculated from resistance of one group of second type temperature measurement elements N indicated by the second conversion measurement value.

The one group of first type temperature measurement elements P may denote the number of first type temperature measurement elements P corresponding to a calculation basis of the first conversion measurement value, and according to an embodiment, may denote the plurality of first type temperature measurement elements P included in the first measurement circuit unit M1. The one group of second type temperature measurement elements N may denote the number of second type temperature measurement elements N corresponding to a calculation basis of the second conversion measurement value, and according to an embodiment, may denote the same number of second type temperature measurement elements N as that of the plurality of first type temperature measurement elements P included in the first measurement circuit unit M1.

The first temperature data is temperature data calculated from the resistance of the one group of first type temperature measurement elements P. The first temperature data is a quantitative parameter collectively defining temperatures of the plurality of battery cells C configuring the battery pack, rather than a temperature of individual battery cell C calculated from individual first type temperature measurement element P, and may denote temperature data calculated collectively from resistances of the one group of first type temperature measurement elements P, rather than a qualitative temperature.

Similarly, the second temperature data is temperature data calculated from the resistance of the one group of second type temperature measurement elements N. The second temperature data is a quantitative parameter collectively defining temperatures of the plurality of battery cells C configuring the battery pack, rather than a temperature of individual battery cell C calculated from individual second type temperature measurement element N, and may denote temperature data calculated collectively from resistances of the one group of second type temperature measurement elements N, rather than a qualitative temperature.

For example, according to an embodiment, the first temperature data and second temperature data do not denote qualitative temperature information of individual battery cell C, but collectively define temperature information of the plurality of battery cells C, and may be parameters that include the temperature information of the plurality of battery cells C, but are on different levels from the temperature information. For example, the first temperature data and second temperature data may be understood as temperature information output from behaviors of the first type temperature measurement element P and the second type temperature measurement element N of FIGS. 4 and 5 by using, as an input, collective resistances of the groups of first type temperature measurement element P and second type temperature measurement element N. Here, because the first temperature data and second temperature data use, as the input, the collective resistances of the groups of first type temperature measurement element P and the second type temperature measurement element N, instead of resistance of individual first type temperature measurement element P and second type temperature measurement element N, the first temperature data and second temperature data output by using, as the input, the collective resistances of the groups of first type temperature measurement element P and second type temperature measurement element N may be different from a temperature of individual battery cell C.

According to an embodiment, the first temperature data and second temperature data are based on the behaviors of the first type temperature measurement element P and the second type temperature measurement element N as shown in FIGS. 4 and 5, output resistances of the first type temperature measurement element P and the second type temperature measurement element N by using a reference temperature for determining overheating as an input, and may be defined by the output resistances of the first type temperature measurement element P and the second type temperature measurement element N and the numbers of groups of first type temperature measurement element P and second type temperature measurement element N that are basis of the first conversion measurement value and the second conversion measurement value, respectively. The difference value between the first temperature data and the second temperature data calculated as such may be determined as the threshold value.

According to an embodiment, the first temperature data and second temperature data may be in units of resistance, or may be in units of temperature output from resistance based on the behaviors of the first type temperature measurement element P and the second type temperature measurement element N shown in FIGS. 4 and 5. For example, when the threshold value is in units of temperature, according to an embodiment, the first conversion measurement value and the second conversion measurement value that are to be compared with the threshold value may also be in units of temperature. For example, the first conversion measurement value and the second conversion measurement value may respectively correspond to values obtained by outputting temperatures of the first type temperature measurement element P and the second type temperature measurement element N shown in FIGS. 4 and 5, by using resistance of the group of first type temperature measurement elements P and resistance of the group of second type temperature measurement element N as inputs.

According to an embodiment, an abnormal temperature or overheating of the battery cell C may be determined based on the threshold value by detecting a case where a temperature difference between a first temperature based on the resistance of the first type temperature measurement element P and a second temperature based on the resistance of the second type temperature measurement element N is between 10° C. to 15° C. (for example, a difference between the first temperature and the second temperature is a temperature set between 10° C. to 15° C.). In other words, the first temperature data and the second temperature data are calculated from the resistances of the first type temperature measurement element P and the second type temperature measurement element N at a time when the temperature difference between the first temperature based on the resistance of the first type temperature measurement element P and the second temperature based on the resistance of the second type temperature measurement element N is a temperature between 10° C. and 15° C., and a difference value between the first temperature data and second temperature data may be determined as the threshold value.

Referring to FIGS. 4 and 5, a difference value between the first conversion measurement value based on the first type temperature measurement element P, in which the resistance change according to the temperature change displays (e.g., exhibits) a positive characteristic, and the second conversion measurement value based on the second type temperature measurement element N, in which the resistance change according to the temperature change displays (e.g., exhibits) a negative characteristic, increases according to an increase in temperature, and thus, when the difference value increases by a predetermined value (e.g., a certain value) or greater, the battery cell C may be determined to have an abnormal temperature or to be overheated. Here, regarding the threshold value for determining an abnormal temperature or overheating of the battery cell C, the first temperature data and the second temperature data may be calculated from the resistances of the group of first type temperature measurement element P and group of second type temperature measurement element N at a time when the temperature difference between the first temperature based on the resistance of the first type temperature measurement element P and the second temperature based on the resistance of the second type temperature measurement element N is a temperature between 10° C. and 15° C., and the difference value between the first temperature data and second temperature data may be determined as the threshold value.

Another aspect of determining the threshold value is as follows. Referring to FIGS. 4 and 5, a resistance characteristic of the first type temperature measurement element P rapidly increases according to the temperature change at a high temperature section, and thus, an error may occur in temperature measurement. Such an error in temperature measurement may gradually increase according to the increase in temperature. To compensate for such a resistance characteristic of the first type temperature measurement element P, the second type temperature measurement element N is applied in parallel together with the first type temperature measurement element P, the first temperature data and second temperature data may be calculated from the resistances of the group of first type temperature measurement element P and group of second type temperature measurement element N at a time when the temperature difference between the first temperature based on the resistance of the first type temperature measurement element P and the second temperature based on the resistance of the second type temperature measurement element N is a temperature between 10° C. and 15° C., and the difference value between the first temperature data and second temperature data may be determined as the threshold value.

According to an embodiment, it is determined that a threshold condition is satisfied when the temperature difference between the first temperature and second temperature corresponds to a temperature between 10° C. and 15° C., for example, it is determined that the threshold condition is satisfied when the temperature difference between the first temperature and second temperature is 10° C. from among 10° C. to 15° C. In an embodiment, a case where the temperature difference between the first temperature and second temperature is 10° C. may be determined as the threshold condition or threshold value for early detection of an abnormal temperature or overheating of the battery cell C. However, according to various embodiments, a case where the temperature difference between the first temperature and second temperature is, for example, 15° C. may be determined as the threshold condition or threshold value considering an increase in temperature in a situation such as high-speed charging of the battery cell C.

According to an embodiment, the measurement circuit unit M may be electrically connected to the battery management system BMS. For example, the terminal Me of FIGS. 6 and 7 provided at one end of the measurement circuit unit M may be connected to a connector of the battery management system BMS. Referring to FIG. 13, the battery management system BMS may include the controller 10 configured to control overall operations of the battery management system BMS, and an analog front end (AFE) 20 connected to the measurement circuit unit M to receive an output of the measurement circuit unit M. The AFE 20 may convert an output regarding temperature information received from the measurement circuit unit M into a quantized digital value, and may transmit the same to the controller 10. The AFE 20 may output an on/off control signal for a charging switch SW2 and a discharging switch SW1, according to a control signal of the controller 10. The battery management system BMS may receive information about a temperature and voltage through a voltage measurement terminal V and the measurement circuit unit M arranged at a location adjacent to the battery cell C. A current sensor R is provided on charging and discharging paths of the battery cell C to measure charging and discharging current amounts of the battery cell C.

According to an embodiment, as described above, the controller 10 may calculate the difference value (V1−V2) between the first measurement value V1 and second measurement value V2 at operation 1208 based on outputs of the first measurement circuit unit M1 and second measurement circuit unit M2, and compare the calculated difference value (V1−V2) with the threshold value at operation 1210, thereby detecting an abnormal temperature or overheating of the battery cell C based on a result of the comparing. Upon detecting that the battery cell C is overheated (e.g., YES at operation 1210), the controller 10 may start a protection operation at operation 1212 for stopping charging and discharging operations of the battery cell C by outputting an off signal for the charging switch SW2 and/or discharging switch SW1, and the method may end. Accordingly, an accident, such as an explosion or ignition, leading from the overheating of the battery cell C may be prevented or substantially prevented.

According to one or more embodiments, a battery pack and a control method for the battery pack are provided, where erroneous detection of overheating may be prevented or substantially prevented, and overheating may be detected without omission, by including a mix of a first type temperature measurement element and a second type temperature measurement element, which have different resistance characteristics from each other according to a temperature change.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A battery pack comprising:

battery cells; and a measurement circuit unit configured to measure temperature information of the battery cells, the measurement circuit unit comprising:

a first measurement circuit unit comprising a first type temperature measurement element; and a second measurement circuit unit comprising a second type temperature measurement element having a different characteristic of a resistance change according to a temperature change from that of the first type temperature measurement element, wherein the first measurement circuit unit and the second measurement circuit unit are on a common base substrate, or on different individual base substrates from each other, and wherein the second type temperature measurement element is mounted in a form of a chip on the common base substrate or at least one of the individual base substrates, and is different from a battery management system configured to receive an output of the second type temperature measurement element.

2. The battery pack of claim 1, wherein the first type temperature measurement element has a positive characteristic of the resistance change according to the temperature change, and wherein the second type temperature measurement element has a negative characteristic of the resistance change according to the temperature change.

3. The battery pack of claim 1, wherein:

the battery cells are arranged along a first direction;

the first measurement circuit unit comprises a pair of first measurement circuit units located at opposite sides of the measurement circuit unit in a second direction crossing the first direction; and the second measurement circuit unit includes a pair of second measurement circuit units located at opposite sides of the measurement circuit unit in the second direction.

4. The battery pack of claim 3, further comprising the battery management system configured to determine an overheated state of the battery cells based on outputs of the pair of first measurement circuit units and the pair of second measurement circuit units.

5. The battery pack of claim 4, wherein the pair of first measurement circuit units are connected in parallel to each other with respect to the battery management system, and wherein the pair of second measurement circuit units are connected in parallel to each other with respect to the battery management system.

6. The battery pack of claim 3, wherein:

the pair of first measurement circuit units are located at edge locations of the opposite sides of the measurement circuit unit in the second direction;

a ground wire is located at a center location of the measurement circuit unit between the pair of first measurement circuit units; and the pair of second measurement circuit units are located between the ground wire and different ones of the pair of first measurement circuit units, respectively.

7. The battery pack of claim 3, wherein the pair of first measurement circuit units have a symmetrical structure based on a center location of the battery cells in the second direction.

8. The battery pack of claim 7, wherein each of the pair of first measurement circuit units comprises the first type temperature measurement element located between opposites ends thereof to be balanced back and forth in the first direction, and wherein one first measurement circuit unit from among the pair of first measurement circuit units provides redundancy for another first measurement circuit unit from among the pair of first measurement circuit units.

9. The battery pack of claim 3, wherein one first measurement circuit unit from among the pair of first measurement circuit units comprises the first type temperature measurement element located to be biased towards a forward location in the first direction between opposites ends of the one first measurement circuit unit, and wherein another first measurement circuit unit from among the pair of first measurement circuit units comprises the first type temperature measurement element located to be biased toward a backward location in the first direction between opposite ends of the another first measurement circuit unit.

10. The battery pack of claim 1, wherein the first type temperature measurement element comprises a plurality of first type temperature measurement elements connected to each other in series between opposite ends of the first measurement circuit unit, and wherein the second type temperature measurement element comprises a single second type temperature measurement element connected between opposite ends of the second measurement circuit unit.

11. The battery pack of claim 1, wherein the battery cells are arranged along a first direction, and wherein the first type temperature measurement element is located in one column in the first direction at an edge location of the measurement circuit unit in a second direction crossing the first direction.

12. The battery pack of claim 1, wherein the first type temperature measurement element comprises a plurality of first type temperature measurement elements located along a first direction along which the battery cells are located and corresponding to the battery cells, respectively, and wherein the second type temperature measurement element comprises a plurality of second type temperature measurement elements in a number that is less than or the same as that of the plurality of first type temperature measurement elements.

13. The battery pack of claim 1, wherein the first type temperature measurement element is patterned or mounted in a form of a chip on the common base substrate or at least one of the individual base substrates.

14. The battery pack of claim 13, wherein the first type temperature measurement element is patterned with a print screen, or patterned with a conductive line including a bent portion.

15. The battery pack of claim 1, wherein each of the battery cells comprises:

an electrode surface including an electrode;

a bottom surface opposite to the electrode surface;

a wide side surface; and a narrow side surface occupying a relatively smaller area than that of the wide side surface, wherein the wide side surface and the narrow side surface connect the electrode surface and the bottom surface to each other.

16. The battery pack of claim 15, wherein at least one of the first measurement circuit unit or the second measurement circuit unit is located on at least the electrode surface of the battery cells.

17. The battery pack of claim 15, wherein at least one of the first measurement circuit unit or the second measurement circuit unit is located on at least the wide side surface of the battery cells.

18. The battery pack of claim 15, wherein at least one of the first measurement circuit unit or the second measurement circuit unit is located on at least the narrow side surface of the battery cells.

19. The battery pack of claim 15, wherein at least one of the first measurement circuit unit or the second measurement circuit unit is located on at least the bottom surface of the battery cells.

20. The battery pack of claim 1, wherein the battery cells comprise:

an angular battery cell comprising a case having a hexahedral shape;

a circular battery cell comprising a case having a cylindrical shape; or a pouch battery cell comprising a case having a pouch shape, wherein the case defines an exterior of the battery cells.

21. The battery pack of claim 1, wherein the common base substrate or the individual base substrates comprise a flexible insulating film of a flexible circuit board or a rigid insulating substrate of a rigid circuit board.

* * * * *